(12) United States Patent
Jung et al.

(10) Patent No.: US 11,360,665 B2
(45) Date of Patent: Jun. 14, 2022

(54) ELECTRONIC DEVICE AND OPERATION METHOD OF EXPANDING WRITING INPUT AREA

(71) Applicant: SAMSUNG ELECTRONICS CO., LTD., Suwon-si (KR)

(72) Inventors: Soyoung Jung, Suwon-si (KR); Sunyoung Kim, Suwon-si (KR); Jooyoun Kim, Suwon-si (KR); Hyunsoo Yuk, Suwon-si (KR); Heuijin Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/993,649

(22) Filed: Aug. 14, 2020

(65) Prior Publication Data

US 2021/0064233 A1 Mar. 4, 2021

(30) Foreign Application Priority Data

Aug. 29, 2019 (KR) .................. 10-2019-0106646

(51) Int. Cl.
*G06F 3/0488* (2022.01)
*G06F 3/04886* (2022.01)
(Continued)

(52) U.S. Cl.
CPC ........ *G06F 3/04886* (2013.01); *G06F 3/0484* (2013.01); *G06F 40/114* (2020.01)

(58) Field of Classification Search
CPC ...... G06F 3/048; G06F 3/0481; G06F 3/0482; G06F 2203/04805; G06F 2203/04806;
(Continued)

(56) References Cited

U.S. PATENT DOCUMENTS

2012/0060114 A1* 3/2012 Chung ............... H04N 21/4438
715/800
2013/0176298 A1* 7/2013 Lee ...................... G06F 3/0485
345/419

(Continued)

FOREIGN PATENT DOCUMENTS

| CN | 102446055 A | 5/2012 |
| EP | 2 685 365 A2 | 1/2014 |

(Continued)

OTHER PUBLICATIONS

Communication dated Jan. 29, 2021 by the European Patent Office in counterpart European patent Application No. 20188959.9.

*Primary Examiner* — Phuong H Nguyen
(74) *Attorney, Agent, or Firm* — Sughrue Mion, PLLC

(57) ABSTRACT

An electronic device having an electronic board function and an operation method thereof. The electronic device includes: a display; a touch input interface; a memory storing at least one instruction; and a processor configured to execute the at least one instruction stored in the memory to: display a writing area in a display area of the display; detect a predefined touch input in the writing area; and based on detecting the predefined touch input, reduce the writing area, display the reduced writing area in at least first part of the display area and provide an extended area in at least second part of the display area, the extended area being configured to receive a writing input continuing from the reduced writing area to the extended area.

17 Claims, 18 Drawing Sheets

(51) Int. Cl.
*G06F 40/114* (2020.01)
*G06F 3/0484* (2022.01)

(58) Field of Classification Search
CPC .... G06F 3/017; G06F 3/0488; G06F 3/04883;
G06F 2203/04808; G09G 2340/0442;
G09G 2340/0407
See application file for complete search history.

(56) References Cited

U.S. PATENT DOCUMENTS

| | | | |
|---|---|---|---|
| 2014/0013269 A1* | 1/2014 | Na | G06F 3/04883 |
| | | | 715/780 |
| 2016/0196051 A1* | 7/2016 | Han | G06F 3/0484 |
| | | | 715/798 |
| 2019/0114022 A1* | 4/2019 | Kim | G06F 3/0484 |
| 2019/0220133 A1 | 7/2019 | Han et al. | |

FOREIGN PATENT DOCUMENTS

| | | | |
|---|---|---|---|
| JP | 2012146017 A | 8/2012 | |
| JP | 5301593 B2 | 9/2013 | |
| KR | 1020190035341 A | 4/2019 | |

\* cited by examiner

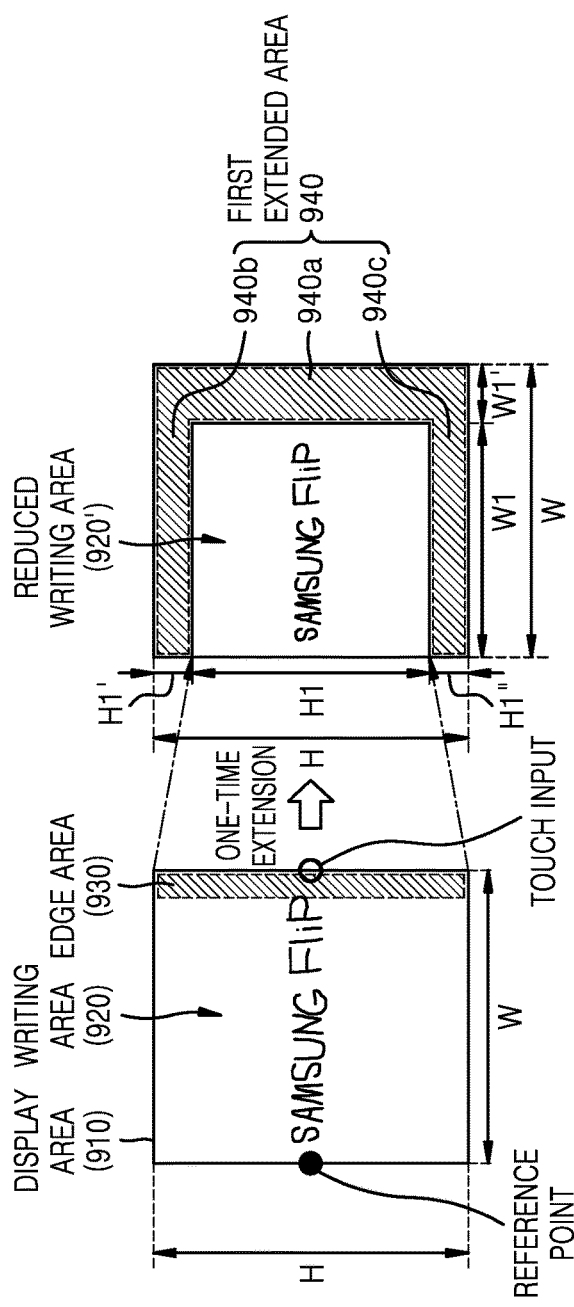
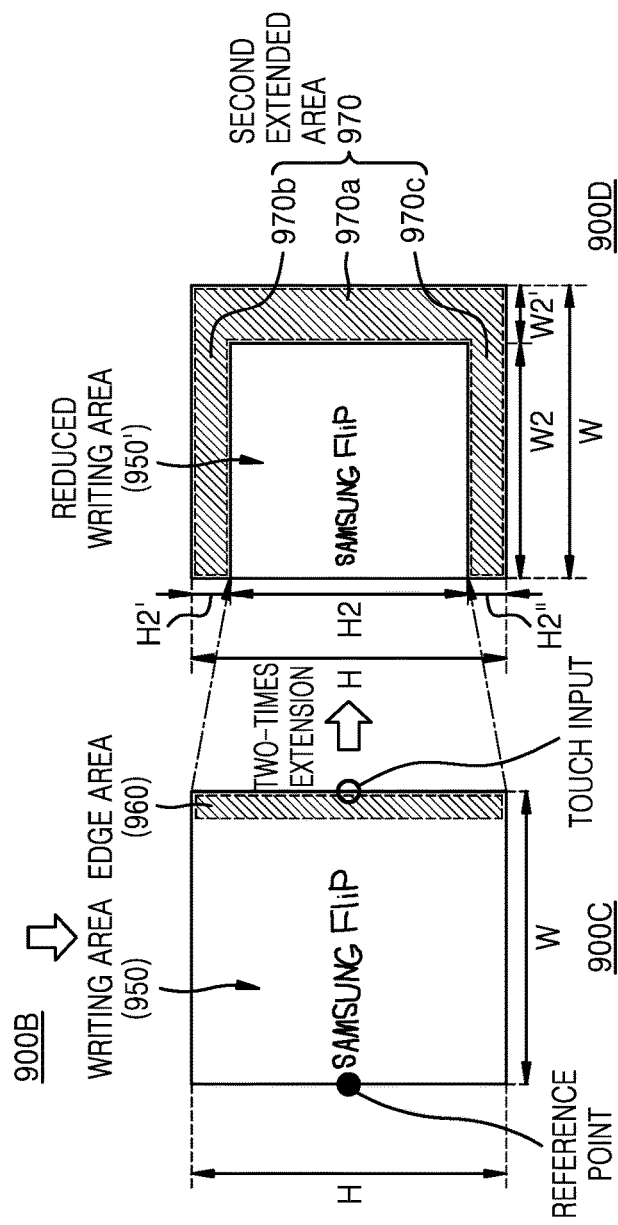
FIG. 9A

FIG. 10A
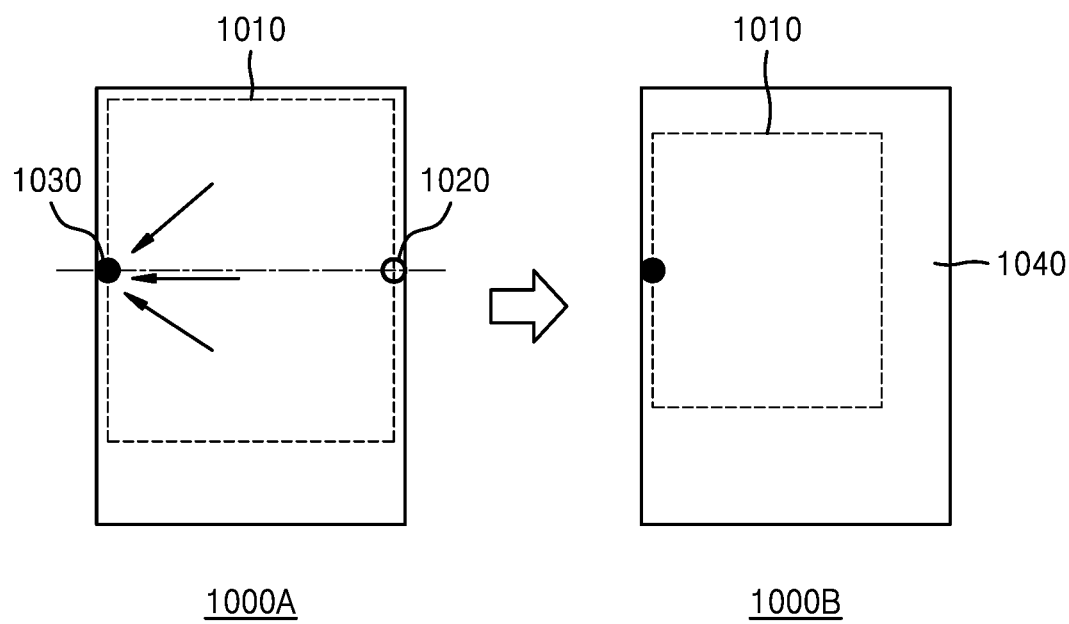
1000A  1000B
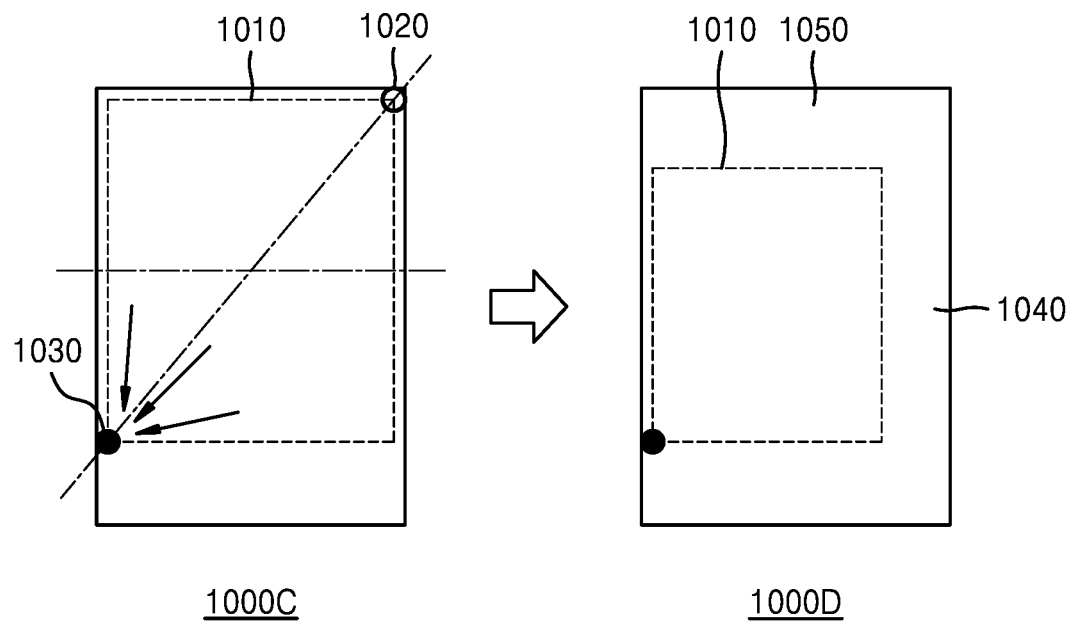
1000C  1000D

FIG. 10B
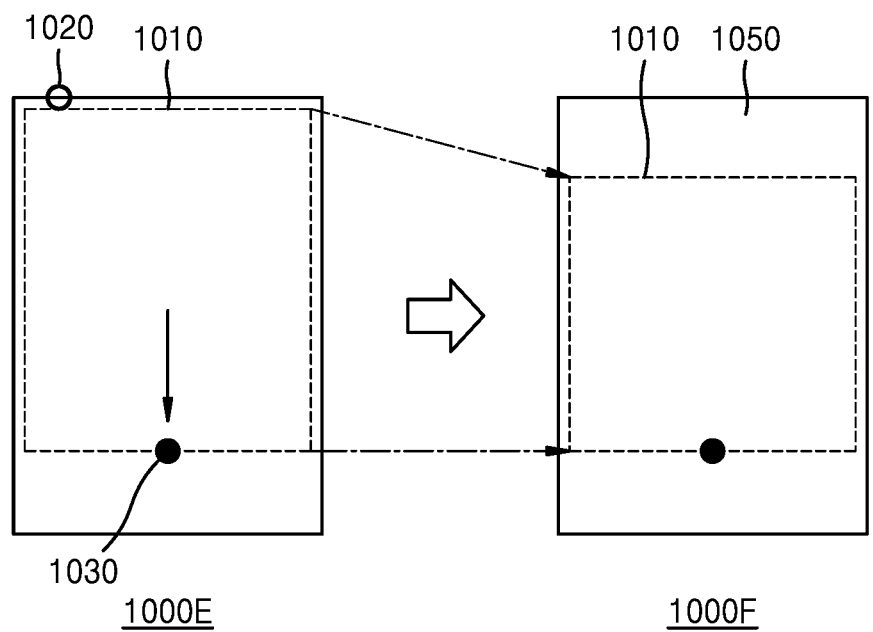
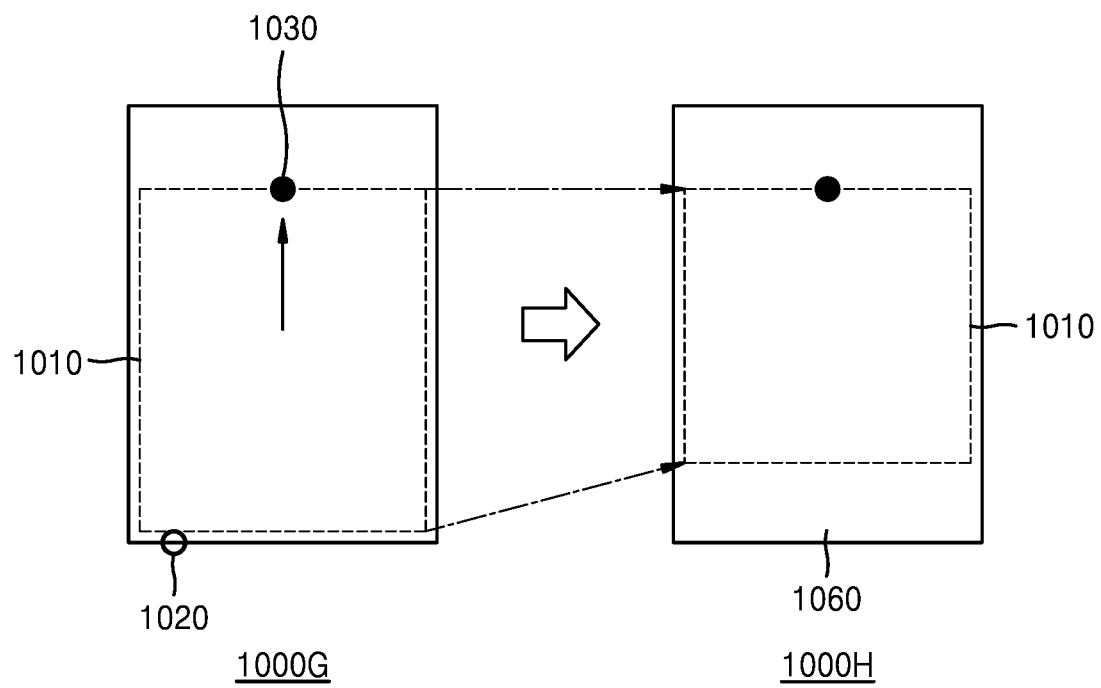

ELECTRONIC DEVICE AND OPERATION METHOD OF EXPANDING WRITING INPUT AREA

CROSS-REFERENCE TO RELATED APPLICATION

This application is based on and claims priority under 35 U.S.C. § 119 to Korean Patent Application No. 10-2019-0106646, filed on Aug. 29, 2019, in the Korean Intellectual Property Office, the disclosure of which is incorporated herein by reference in its entirety.

BACKGROUND

1. Field

Embodiments of the disclosure relate to an electronic device and an operation method thereof, and more particularly, to an electronic device having an electronic board function and an operation method thereof.

2. Description of Related Art

With the development of electronic technologies, various kinds of electronic products have been developed and distributed. In particular, various display devices, such as TVs, mobile phones, personal computers (PCs), laptop computers, personal digital assistants (PDAs), and the like, are widely used in homes.

Also, an electronic board device having a handwriting input function, in addition to a content display function in the display devices, is widely used.

The electronic board device is generally shared by many people. For example, a user may give a presentation to other users by using the electronic board device. Also, due to properties of the electronic board device, a size of a document (for example, a page), which is a target of a writing input, may be fixed. However, when the space of a page becomes insufficient as the user writes using the electronic board device, the user cannot expand the fixed size of the page due to the properties of the electronic board device and may be inconvenient for the user.

SUMMARY

Various embodiments of the disclosure provide an electronic device having an electronic board function and facilitate expansion of a writing input interface (area), and an operation method of the electronic device.

Additional aspects, features, and advantages will be set forth in part in the description which follows and, in part, will be apparent from the description, or may be learned by practice of the embodiments of the disclosure.

According to an embodiment, there is provided an electronic device including: a display; a touch input interface; a memory storing at least one instruction; and a processor configured to execute the at least one instruction stored in the memory to: display a writing area in a display area of the display; detect a predefined touch input in the writing area; and based on detecting the predefined touch input, reduce the writing area, display the reduced writing area in at least first part of the display area and provide an extended area in at least second part of the display area, the extended area being configured to receive a writing input continuing from the reduced writing area.

The predefined touch input includes at least one of a touch input for a first predefined time or more in the writing area, a touch input made repeatedly for a second predefined time in the writing area, or a touch input of which pressure exceeds a threshold value in the writing area.

The processor is further configured to execute the at least one instruction to: provide a user interface for confirming whether the extended area is to be provided in the display area in response to the detection of the predefined touch input; and based on receiving a user input in the user interface, provide the extended area.

The processor is further configured to execute the at least one instruction to: based on the detection of the predefined touch input, reduce the writing area in each page among a plurality of pages included in a document, wherein a first page among the plurality of pages is an execution target of a current touch input, and provide the extended area by applying the extended area to the plurality of pages in the document.

The processor is further configured to execute the at least one instruction to: based on the detection of the predefined touch input, reduce the writing area included in a current page among a plurality of pages in a document, the current page being an execution target of a current touch input, and provide the extended area by applying the extended area to the current page.

The processor is further configured to execute the at least one instruction to, based on the detection of the predefined touch input, reduce an object area related to a location of the predefined touch input in the writing area, and provide the extended area by applying the extended area to the object area.

The processor is further configured to execute the at least one instruction to: identify a parameter value corresponding to the predefined touch input; and determine a size of the extended area according to the parameter value, where the parameter value corresponding to the predefined touch input includes at least one of a duration time of the predefined touch input, pressure corresponding to the predefined touch input, or a number of times of the predefined touch input.

The processor is further configured to execute the at least one instruction to: identify a location of the predefined touch input; determine a reference point with respect to the location of the predefined touch input; and reduce the writing area based on the reference point and provide the extended area at a location where a space is generated in the display area.

The processor is further configured to execute the at least one instruction to detect the predefined touch input in an edge area of the writing area, where the edge area is positioned on at least one of a right edge, a left edge, an upper edge, or a lower edge of the writing area.

According to an embodiment, there is provided an operation method of an electronic device, the operation method including: displaying a writing area in a display area of a display of the electronic device; detecting a predefined touch input in the writing area; and based on detecting the predefined touch input, reducing the writing area, displaying the reduced writing area in at least first part of the display area and providing an extended area in at least second part of the display area, the extended area being configured to receive a writing input continuing from the reduced writing area.

The predefined touch input includes at least one of a touch input for a first predefined time or more in the writing area, a touch input made repeatedly for a second predefined time in the writing area, or a touch input of which pressure exceeds a threshold value in the writing area.

The operation method further includes: providing a user interface for confirming whether the extended area is to be provided in the display area in response to the detection of the predefined touch input; and based on receiving a user input in the user interface, providing the extended area.

The operation method further includes: based on the detection of the predefined touch input, reducing the writing area in each page among a plurality of pages included in a document, wherein a first page among the plurality of pages is an execution target of a current touch input, and providing the extended area by applying the extended area to the plurality of pages in the document.

The operation method further includes: based on the detection of the predefined touch input, reducing the writing area included in a current page among a plurality of pages in a document, the current page being an execution target of a current touch input, and providing the extended area by applying the extended area to the current page.

The operation method further includes, based on the detection of the predefined touch input, reducing an object area related to a location of the predefined touch input in the writing area, and providing the extended area by applying the extended area to the object area.

The operation method further includes: identifying a parameter value corresponding to the detected predefined touch input; and determining a size of the extended area according to the parameter value, where the parameter value corresponding to the predefined touch input includes at least one of a duration time of the predefined touch input, pressure corresponding to the predefined touch input, or a number of times of the predefined touch input.

The operation method further includes: identifying a location of the detected predefined touch input; determining a reference point with respect to the location of the predefined touch input; and reducing the writing area based on the reference point and providing the extended area at a location where a space is generated in the display area.

The operation method further includes detecting the predefined touch input in an edge area of the writing area, where the edge area is positioned on at least one of a right edge, a left edge, an upper edge, or a lower edge of the writing area.

According to an embodiment, there is provided a non-transitory computer-readable recording medium storing a program for performing an operation method of an electronic device, by a processor, the operation method including: displaying a writing area in a display area of a display of the electronic device; detecting a predefined touch input in the writing area; and based on detecting the predefined touch input, reducing the writing area, displaying the reduced writing area in at least first part of the display area and providing an extended area in at least second part of the display area, the extended area being configured to receive a writing input continuing from the reduced writing area.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9A is a reference view illustrating a method of providing an extended area according to an embodiment;

FIG. 10A is a reference view illustrating a method of reducing a writing area and positioning the reduced writing area according to an embodiment;

FIG. 10B is a reference view illustrating a method of reducing a writing area and positioning the reduced writing area according to an embodiment;

FIG. 15 is a reference view illustrating an extended area in an example of writing using a brush according to an embodiment of.

DETAILED DESCRIPTION

Figure 1:
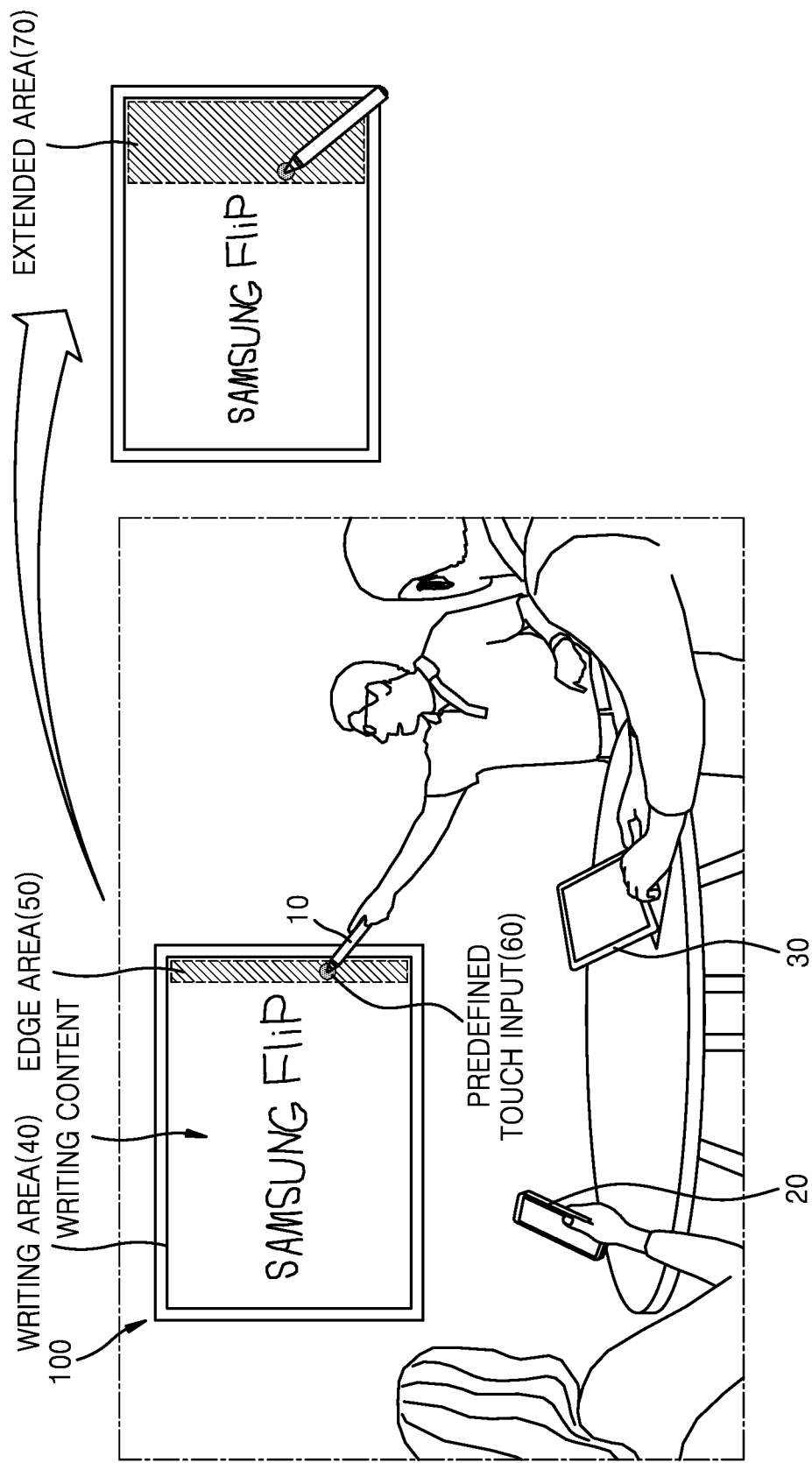
FIG. 1 is a reference view illustrating an electronic device having an electronic board function according to an embodiment.

Terms used herein will be briefly described, and the disclosure will be described in detail.

Although widely used terms were selected as terminology used in the disclosure, they may vary according to intentions of one of ordinary skill in the art, judicial precedents, the advent of new technologies, and the like. Terms arbitrarily selected in the disclosure may also be used in a specific case.

Throughout the disclosure, the expression "at least one of a, b or c" indicates only a, only b, only c, both a and b, both a and c, both b and c, all of a, b, and c, or variations thereof.

It will be understood that when a certain part "includes" a certain component, the part does not exclude another component but can further include another component, unless the context clearly indicates otherwise. As used herein, the terms "portion", "module", etc. refers to a unit that can perform at least one function or operation, and may be implemented as hardware, software, or a combination of hardware and software.

Hereinafter, embodiments will be described in detail with reference to the accompanying drawings so that the disclosure may be readily implemented by one of ordinary skill in the technical field to which the disclosure pertains. However, the disclosure can be implemented in various different forms, and is not limited to the embodiments described herein. Also, in the drawings, portions irrelevant to the description are not shown in order to more clearly describe the embodiments, and throughout the disclosure, similar components are assigned like reference numerals.

The term "user" means a person who controls the functions or operations of an image display device using a controller, and may include a viewer, a manager, or an installation engineer.

FIG. 1 is a reference view illustrating an electronic device having an electronic board function according to an embodiment.

Referring to FIG. 1, an electronic device 100 having an electronic board function may perform various operations. For example, a user may make a handwriting input on the electronic device 100 with his/her finger or a pen 10, connect the electronic device 100 to external devices 20 and 30 to transmit/receive data to/from the external devices 20 and 30, or perform data mirroring with the external devices 20 and 30.

A document file which is a target of a writing input in the electronic device 100 may be referred to as a roll. The roll may be a file including a plurality of connected pages. A roll may include, for example, 1 to 20 pages. The number of pages of a roll may depend on a system status. A roll may be used in two modes, such as a horizontal mode and a vertical mode.

Figure 2:
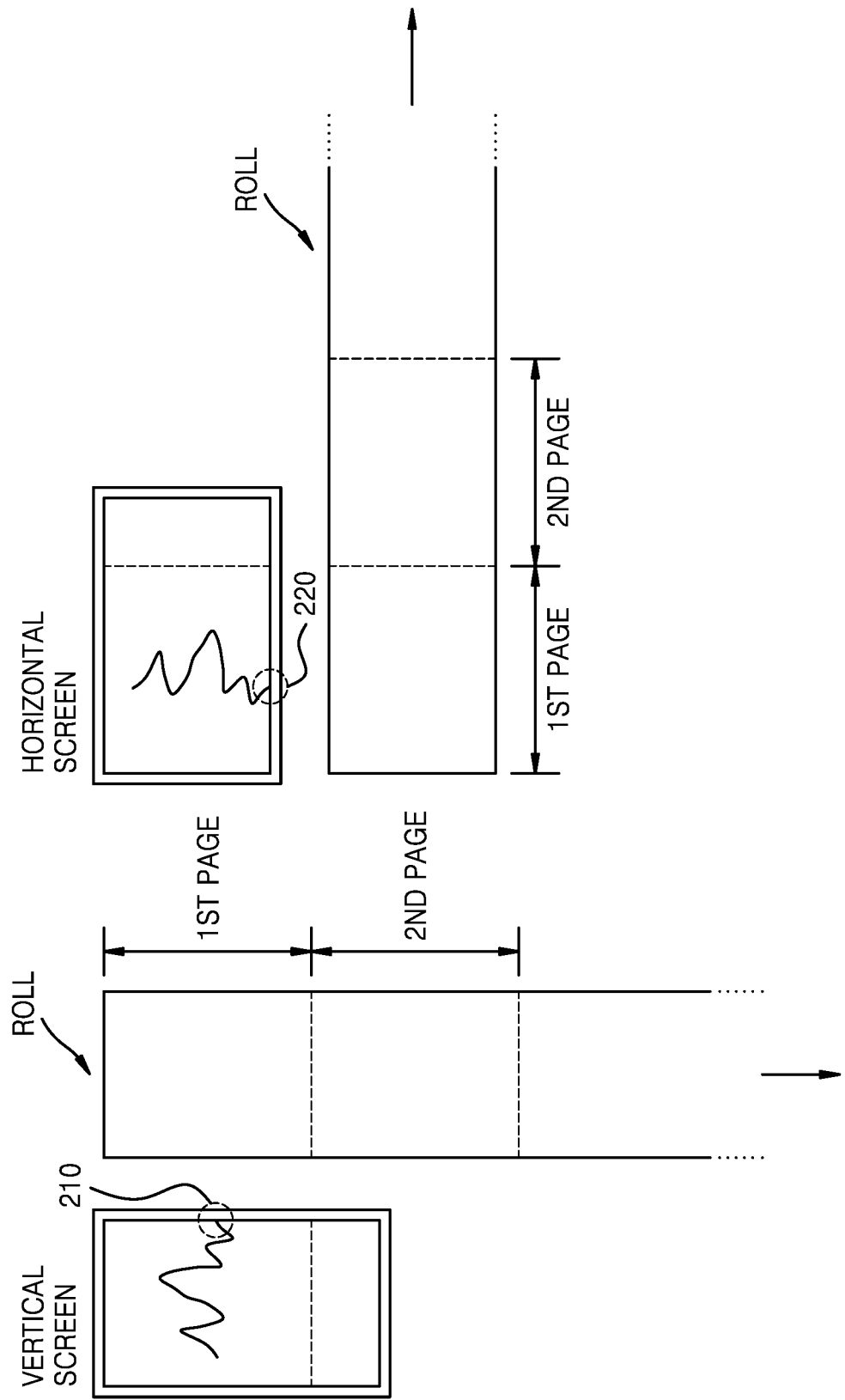
FIG. 2 is a schematic diagram illustrating examples of rolls that are used in a vertical mode and a horizontal mode according to an embodiment.

FIG. 2 is a schematic diagram illustrating examples of rolls that are used in a vertical mode and a horizontal mode according to an embodiment.

Referring to FIG. 2, when the electronic device 100 is positioned to show a vertical screen, a roll may be used in the vertical mode. When the roll is used in the vertical mode, pages are connected vertically in a direction of their longer sides. Accordingly, a user may use new pages by scrolling pages down. However, there may be a case in which, when a user uses a roll in the vertical mode and writes in a horizontal direction of a page until arriving at an end 210 of a screen, the user may want to continuously write in the horizontal direction. In this case, the user may not be able to continue writing in the horizontal direction because horizontal and vertical lengths of each page have fixed sizes.

When the electronic device 100 is positioned to show a horizontal screen, a roll may be used in the horizontal mode. When the roll is used in the horizontal mode, pages are connected horizontally in such a way to follow one after another at their shorter sides. Accordingly, a user may use new pages by scrolling pages to the left or right. However, there may be a case in which, when a user uses a roll in the horizontal mode and writes in a vertical direction of a page until arriving at an end 220 of a screen, the user may want to continuously write in the vertical direction. In this case, the user may not be able to continue writing in the vertical direction because horizontal and vertical lengths of each page have fixed sizes.

Accordingly, embodiments of the disclosure provide the electronic device 100 capable of contextually recognizing, when a user makes a writing input on the electronic device 100, that an area extension is required to provide an extended area, thereby enabling the user to extend a size-fixed page.

Referring back to FIG. 1, when the user makes a writing input on a writing area 40 by using the electronic device 100, the user may not find a space to make a writing input on a screen of the electronic device 100. In this case, the user may make a predefined touch input 60 in an edge area 50. Then, the electronic device 100 may determine the predefined touch input 60 as the user's intention for extending an area for a writing input, reduce the writing area 40, and provide an extended area 70. In FIG. 1, because writing context included in the writing area 40 is "SAMSUNG FliP," the electronic device 100 may reduce the writing area 40 including the writing content "SAMSUNG Flip," and provide the extended area 70 in a space generated when the writing area 40 is reduced. When the extended area 70 is provided, the user may make an additional writing input following the writing input by using the extended area 70. In this way, by providing an extended area by a user's simple touch input, the electronic device 100 may easily provide the user with an additional space for a writing input without requiring the user's menu control or button control, and provide the user with an experience of making a writing input without interruption regardless of a space of a writing area.

According to an embodiment, when the electronic device 100 detects the predefined touch input within the edge area 50, the electronic device 100 may recognize the predefined touch input as a trigger for providing the extended area 70. The predefined touch input may be one of various types of touch inputs. For example, when a touch input continues for a predefined time or more within the edge area 50, when a touch input is made two times in a predefined time within the edge area 50, or when pressure of a touch input exceeds a threshold value within the edge area 50, the electronic device 100 may detect the touch input as the predefined touch input. However, the above-mentioned touch inputs are only examples, and the electronic device 100 may use other types of touch inputs.

Also, the edge area 50 as a location in the writing area 40 from which the predefined touch input is detected may be an example, and the predefined touch input may be detected from any other location in the writing area 40.

According to an embodiment, after the electronic device 100 detects the predefined touch input, the electronic device 100 may automatically provide a user interface for confirming the user's intention with respect to the extended area 70 before providing the extended area 70, and then provide the extended area 70 in response to the user's input to the user interface. For example, when the electronic device 100 detects the predefined touch input, the electronic device 100 may output a pop-up window for inquiring the user about whether he/she wants the extended area 70, and provide the extended area 70 after receiving the user's confirmation to the pop-up window. As such, by inquiring the user's intention before providing an extended area, the electronic device 100 may be prevented from providing an extended area unintended by the user.

According to an embodiment, the electronic device 100 may reduce a writing area in response to a detection of the predefined touch input, and provide an extended area by using a space generated when the writing area is reduced. A range of the reduced writing area may be determined according to a setting of the electronic device 100 or a user's setting. For example, the reduced writing area may be a writing area corresponding to the entirety of a document which is an execution target of a current touch input, and in this case, the extended area may be applied to the entire document and provided. For example, the reduced writing area may be a writing area included in a current page displayed on a display in a document which is an execution target of a current touch input, and in this case, the extended area may be applied to the current page and provided. For example, the reduced writing area may be an object area related to a location of a touch input, and in this case, the extended area may be applied to the object area and provided.

According to an embodiment, the electronic device 100 may determine a size of the extended area according to a parameter value corresponding to the detected touch input. For example, the parameter value corresponding to the touch input may include at least one of a duration time of the touch input, pressure corresponding to the touch input, or the number of touch input. For example, the electronic device 100 may determine the size of the extended area in proportion to the duration time of the touch input. As another example, the electronic device 100 may increase the size of the extended area based on the number of touch inputs being received within a predetermined time frame. As yet another example, the electronic device 100 may determine the size of the extended area in proportion to pressure of the touch input. As such, by adjusting a size of an extended area according to a parameter value corresponding to a touch input, the electronic device 100 may enable a user to conveniently adjust the size of the extended area without having to navigate through a control menu or press additional buttons.

According to an embodiment, the electronic device 100 may identify a location of a detected touch input, define a reference point that is relative to the determined location of the touch input, reduce a writing area based on the reference point, and provide an extended area in a space generated in a display area when the writing area is reduced. For example, referring to FIG. 1, the predefined touch input 60 may be made on a right edge area (e.g., edge area 50 of FIG. 1), and a reference point that is relative to the predefined touch input 60 may be at a location corresponding to a left edge area. Because the writing area 40 is reduced based on the reference point, the writing area 40 may move to the left, and thus a space may be generated to the right of the writing area 40. Accordingly, the extended area 70 may be provided to the right of the writing area 40 as shown in FIG. 1. According to various embodiments, the edge area 50 may be positioned on at least one of a right edge, a left edge, an upper edge, or a lower edge of the writing area 40.

Figure 3:
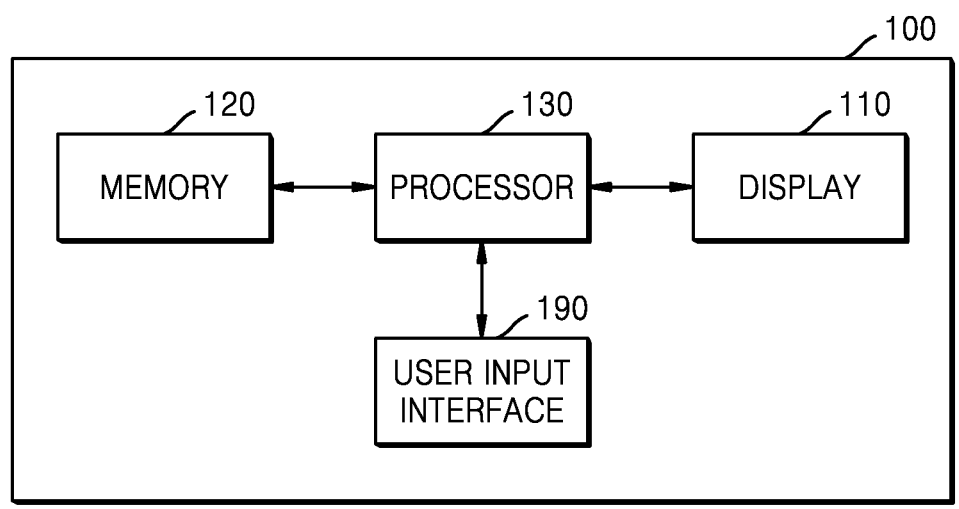
FIG. 3 is a block diagram of an electronic device according to an embodiment.

FIG. 3 is a block diagram of an electronic device according to an embodiment.

Referring to FIG. 3, the electronic device 100 may include a display 110, a memory 120, a processor 130, and a user input interface 190. However, the electronic device 100 is not limited thereto, and may be implemented with more or less components than the components shown in FIG. 3.

The display 110 may display data that is processed in the electronic device 100. When the display 110 is implemented as a touch screen, the display 110 may be used as an input device, as well as an output device. For example, the display 110 may include at least one of a liquid crystal display (LCD), a thin film transistor-liquid crystal display (TFT-LCD), an organic light-emitting diode (OLED) display, a flexible display, a 3Dimensional (3D) display, or an electrophoretic display.

The user input interface 190, which is an interface for receiving a user input, may receive a touch input by using a touch sensitive device. The user input may include a touch input made by a user's finger, a touch input made by a user's palm, an input made by an electronic pen, etc. Also, the user input may include an input made by a general brush. In this case, the user may have an experience as though he/she draws a picture with a brush on a canvas. In addition, the user input interface 190 may include a touch sensitive device for measuring pressure of a detected touch input.

The memory 120 may store programs for processing and controlling of the processor 130. The memory 120 may store data input to the electronic device 100 and data that is to be output from the electronic device 100.

The memory 120 may include at least one type of storage medium of a flash memory type, a hard disk type, a multimedia card micro type, card type memory (for example, secure digital (SD) memory or extreme digital (XD) memory), random access memory (RAM), static random access memory (SRAM), read-only memory (ROM), electrically erasable programmable read-only memory (EEPROM), programmable read-only memory (PROM), magnetic memory, a magnetic disk, or an optical disk.

The memory 120 may include at least one instruction for performing an extended area providing at least one function disclosed herein.

The processor 130 may control overall operations of the electronic device 100. For example, the processor 130 may execute at least one instruction stored in the memory 120 to control the display 110 and perform functions of the electronic device 100 shown in FIGS. 1 to 16.

According to an embodiment, the processor 130 may execute at least one instruction stored in the memory 120 to detect a predefined touch input in a writing area displayed on a pre-defined display area, reduce the writing area in response to the detection of the predefined touch input, and provide an extended area for a writing input.

The predefined touch input may include at least one of a touch input maintained for a predefined time or more within the writing area, a touch input corresponding to a double tap made within the writing area, or a touch input of which pressure exceeds a threshold value in the writing area.

According to an embodiment, the processor 130 may execute at least one instruction stored in the memory 120 to provide a user interface for confirming a user's intention with respect to an extended area in response to a detection of a predefined touch input, and provide the extended area in response to the user's input reacting to the user interface.

According to an embodiment, the processor 130 may execute at least one instruction stored in the memory 120 to reduce the entirety of a document which is an execution target of a current touch input in response to a detection of a predefined touch input, apply an extended area to the entire document, and provide the extended area.

According to an embodiment, the processor 130 may execute at least one instruction stored in the memory 120 to reduce a writing area included in a current page displayed on the display 110 in a document which is an execution target of a current touch input, in response to a detection of a predefined touch input, apply an extended area to the current page, and provide the extended area.

The processor 130 may execute at least one instruction stored in the memory 120 to reduce an object area related to a location of a touch input, in response to a detection of a predefined touch input, apply an extended area to the object area, and provide the extended area.

According to an embodiment, the processor 130 may execute at least one instruction stored in the memory 120 to identify a parameter value corresponding to a detected touch input and determine a size of an extended area according to the parameter value. The parameter value corresponding to the touch input may include at least one of a duration time of the touch input, pressure corresponding to the touch input, or the number of times which the touch input is made.

Furthermore, the processor 130 may execute at least one instruction stored in the memory 120 to identify a location of a detected touch input, define a reference point that is relative to the determined location of the touch input, reduce a writing area based on the reference point, and provide an extended area at a location where a space is generated in the writing area when the writing area is reduced. An edge area may be positioned on at least one of a right edge, a left edge, an upper edge, or a lower edge of the writing area.

Figure 4:
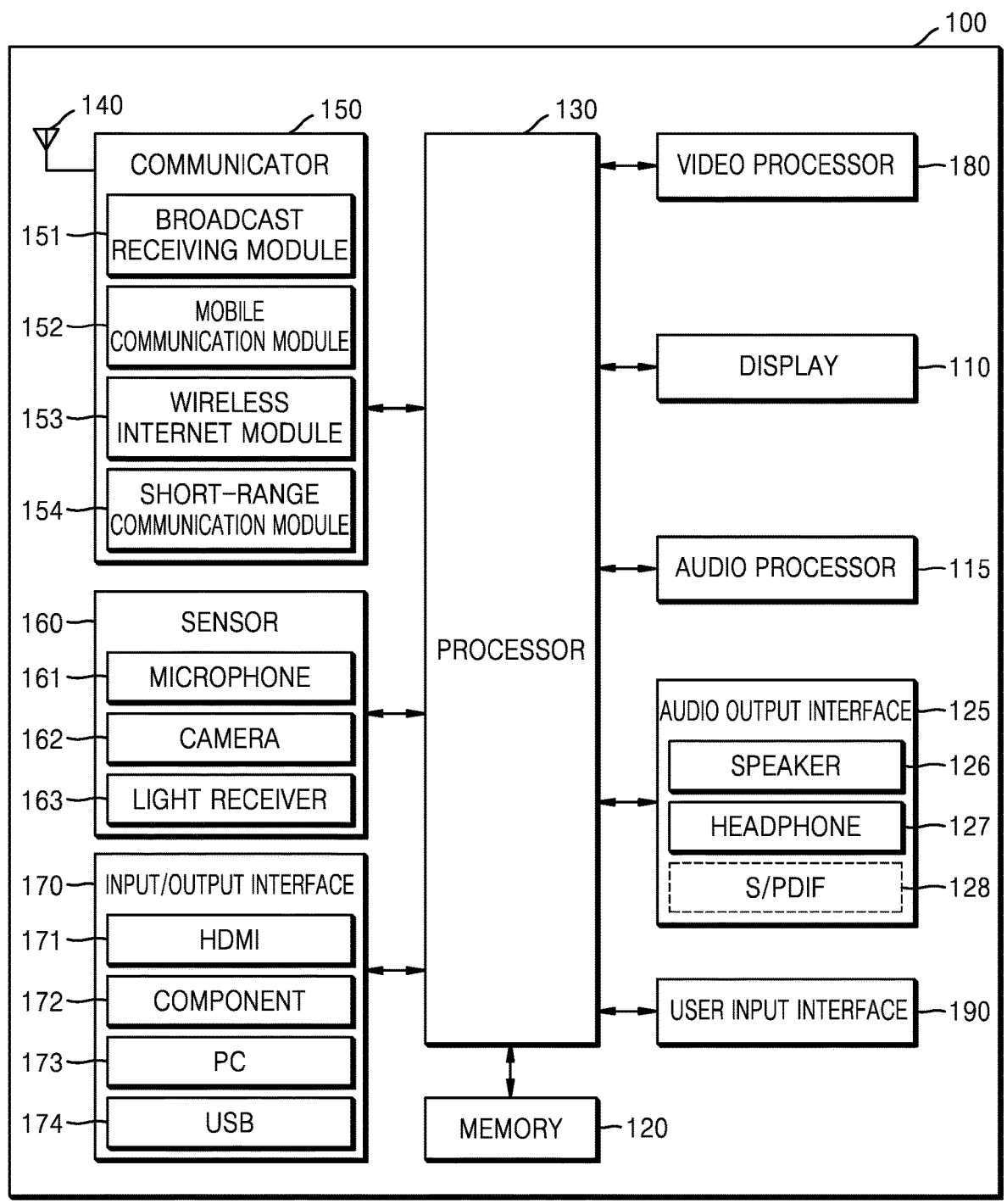
FIG. 4 is a block diagram illustrating a configuration of an electronic device according to an embodiment.

FIG. 4 is a block diagram showing a configuration of an electronic device according to an embodiment.

As shown in FIG. 4, the electronic device 100 may further include a video processor 180, an audio processor 115, an audio output interface 125, a tuner 140, a communicator 150, a sensor 160, and an input/output interface 170, in addition to the display 110, the memory 120, the processor 130, and the user input interface 190.

Descriptions overlapping with those given above about the display 110, the memory 120, the processor 130, and the user input interface 190 with reference to FIG. 3 will be omitted in the following descriptions with reference to FIG. 4.

The tuner 140 may amplify, mix, or resonate a broadcasting signal received in a wired or wireless manner to tune and select a frequency of a channel at which the electronic device 100 is to receive the broadcasting signal from among a plurality of radio wave components. The broadcasting signal may include audio, video, and additional information (for example, electronic program guide (EPG)).

The communicator 150 may connect the electronic device 100 to an external device (for example, an audio device, a mobile device, etc.) by a control of the processor 130. The processor 130 may transmit/receive content to/from an external device connected through the communicator 150, download an application from the external device, or perform web browsing.

The communicator 150 may include at least one module to enable wireless communications between the electronic device 100 and a wireless communication system or between the electronic device 100 and a network on which another electronic device is located. For example, the communicator 150 may include a broadcast receiving module 151, a mobile communication module 152, a wireless internet module 153, and a short-range communication module 154. The communicator 150 is also referred to as a transmitter/receiver.

The broadcast receiving module 151 may receive a broadcast signal and/or broadcast-related information from an external broadcast management server through a broadcast channel. The broadcast signal may include a TV broadcast signal, a radio broadcast signal, a data broadcast signal, and a broadcast signal resulting from combining a TV broadcast signal or a radio broadcast signal with a data broadcast signal.

The mobile communication module 152 may transmit/receive wireless signals to/from at least one of a base station, an external terminal, or a server on a mobile communication network. The wireless signal may include a voice call signal, a video call signal or various formats of data according to transmission/reception of text/multimedia messages.

The wireless internet module 153 may be a module for wireless internet connections, and installed inside or outside the electronic device 100. As wireless internet technology, wireless LAN (WLAN), Wireless-Fidelity (Wi-Fi), World Interoperability for Microwave Access (Wimax), High Speed Downlink Packet Access (HSDPA), etc. may be used. Through the wireless internet module 153, the electronic device 100 may establish a Wi-Fi connection to another device. For example, the processor 130 may communicate with at least one AP 300 through the wireless internet module 153.

The short-range communication module 154 may be a module for short-range communication. As short-range communication technology, Bluetooth, Radio Frequency Identification (RFID), Infrared Data Association (IrDA), Ultra Wideband (UWB), Zigbee, etc. may be used.

The sensor 160 may sense a user's voice, a user's image, or a user's interaction, and may include a microphone 161, a camera 162, and a light receiver 163.

The microphone 161 may receive a voice uttered by a user. The microphone 161 may convert the received voice into an electrical signal and output the electrical signal to the controller 130.

The camera 162 may receive an image (for example, successive frames) corresponding to a user's motion including a gesture in a camera recognition range.

The light receiver 163 may receive an optical signal (including a control signal) transmitted from a remote controller. The light receiver 163 may receive an optical signal corresponding to a user input (for example, a touch, pressing, a touch gesture, a voice, or a motion) from the remote controller. A control signal may be extracted from the received optical signal by a control of the processor 130.

The input/output interface 170 may receive video (for example, a moving image, etc.), audio (for example, a voice, music, etc.), and additional information (for example, EPG, etc.) from an outside of the electronic device 100 by a control of the processor 130. The input/output interface 170 may include one or a combination of a high-definition multimedia interface (HDMI) port 171, a component jack 172, a PC port 173, and a USB port 174.

The video processor 180 may process image data that is to be displayed on the display 110, and perform various image processing operations on the image data, such as decoding, rendering, scaling, noise filtering, frame-rate conversion, and resolution conversion.

The display 110 may display video included in a broadcasting signal received through the tuner 140 on a screen by a control of the processor 130. Also, the display 110 may display content (for example, a moving image) received through the communicator 150 or the input/output interface 170. The display 110 may output an image stored in the memory 120 by a control of the processor 130.

When the display 110 and a touch pad form a layer structure to be configured as a touch screen, the display 110 may be used as an input device, as well as an output device. The display 110 may include at least one of a liquid crystal display (LCD), a thin film transistor-liquid crystal display (TFT-LCD), an organic light-emitting diode (OLED) display, a flexible display, a 3dimensional (3D) display, or an electrophoretic display.

The audio processor 115 may process audio data. The audio processor 115 may perform various processing on the audio data, such as decoding, amplification, noise filtering, etc.

The audio output interface 125 may output audio included in a broadcasting signal received through the tuner 140, audio input through the communicator 150 or the inputter/outputter 170, and audio stored in the memory 120, by the control of the processor 130. The audio output interface 125 may include at least one of a speaker 126, a headphone output terminal 127, or a Sony/Philips Digital Interface (S/PDIF) output terminal 128.

The user input interface 190 may enable a user to input data for controlling the electronic device 100. The user input interface 190 may include a touch inputter for receiving touch inputs. For example, the user input interface 190 may be a key pad, a dome switch, a touch pad (a capacitive type, a resistive type, an infrared beam type, a surface acoustic wave type, an integral strain gauge type, a piezo effect type, etc.), a jog wheel, a jog switch, etc. However, the user input interface 190 is not limited thereto.

The memory 120 may store programs for processing and control of the processor 130, and store data input to the electronic device 100 and data to be output from the electronic device 100.

The processor 130 may perform functions of controlling overall operations of the electronic device 100 and signal flow between the internal components of the electronic device 100 to process data. When a user's input is received or a condition set in advance and stored is satisfied, the processor 130 may execute Operating System (OS) and various applications stored in the memory 120. Also, the processor 130 may execute at least one instruction to implement a function for providing an extended area in a display area, stored in the memory 120.

The block diagrams of the electronic device 100 shown in FIGS. 3 and 4 are example embodiments of the disclosure. Some of the components of the block diagrams may be integrated or omitted, or other components may be removed or added, according to an actual implementation of the electronic device 100. For example, two or more of the components may be integrated into one component, or one component may be subdivided into two or more components, as necessary. Also, a function that is performed in each block is only provided to describe the embodiments, and detailed operations or devices therefor should not be considered as limiting the scope of the disclosure.

Figure 5:
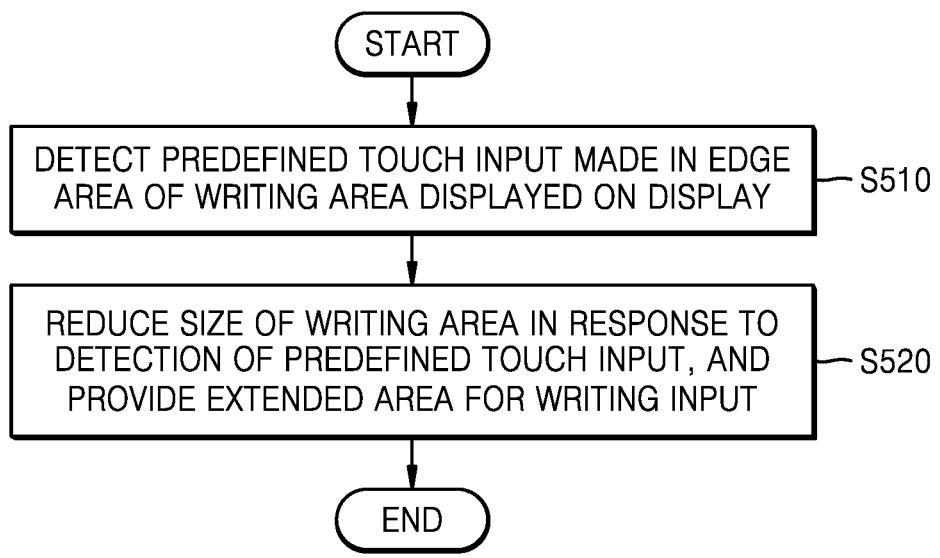
FIG. 5 is a flowchart of an operation method of an electronic device according to an embodiment.

FIG. 5 is a flowchart of an operation method of an electronic device according to an embodiment.

Referring to FIG. 5, in operation 510, the electronic device 100 may detect a predefined touch input made in an edge area of a writing area displayed on a display through a touch inputter.

The edge area may include a right edge area, a left edge area, a upper edge area, and a lower edge area corresponding to edges of the writing area displayed on the display, However, the predefined touch input is not limited to an input made in the edge area of the writing area, and the electronic device 100 may detect the predefined touch input made at any other location of the writing area.

The predefined touch input may be a touch input maintained without interruption for a predefined time or more in the edge area, a touch input made repeatedly for a short time, a touch input of which pressure exceeds a threshold value, etc.

In operation 520, the electronic device 100 may reduce a size of the writing area in response to the detection of the predefined touch input, and provide an extended area extended from the writing area to allow a writing input.

When the electronic device 100 detects the predefined touch input in the edge area, the electronic device 100 may recognize the predefined touch input as a user's intention for adding an extended area, and perform an operation for providing an extended area.

The electronic device 100 may determine a range of the reduced writing area to be one of various ranges. For example, the electronic device 100 may reduce the entire of the corresponding roll, a writing area included in a current page, or an object area related to a touch input.

The electronic device 100 may determine a size of the extended area according to a parameter value of the predefined touch input, for example, in proportion to a magnitude of the parameter value. For example, the electronic device 100 may determine a size of the extended area based on parameter values, such as a duration of a touch input, a number of touch inputs made repeatedly, or pressure of a touch input. Specifically, for example, the longer the period of the user's touch input, the larger the extended area. As another example, the greater the number of touch inputs, the larger the extended area. As yet another example, the greater the pressure of the user's touch input, the larger the extended area. However, these are merely examples, and the embodiments may include other parameter values to adjust the size of the extended area.

According to an embodiment, the electronic device 100 may identify a location of a detected touch input, define a reference point that is relative to the determined location of the touch input, reduce a writing area based on the reference point, and provide an extended area at a location where a space is generated in a display area when the writing area is reduced.

Figure 6:
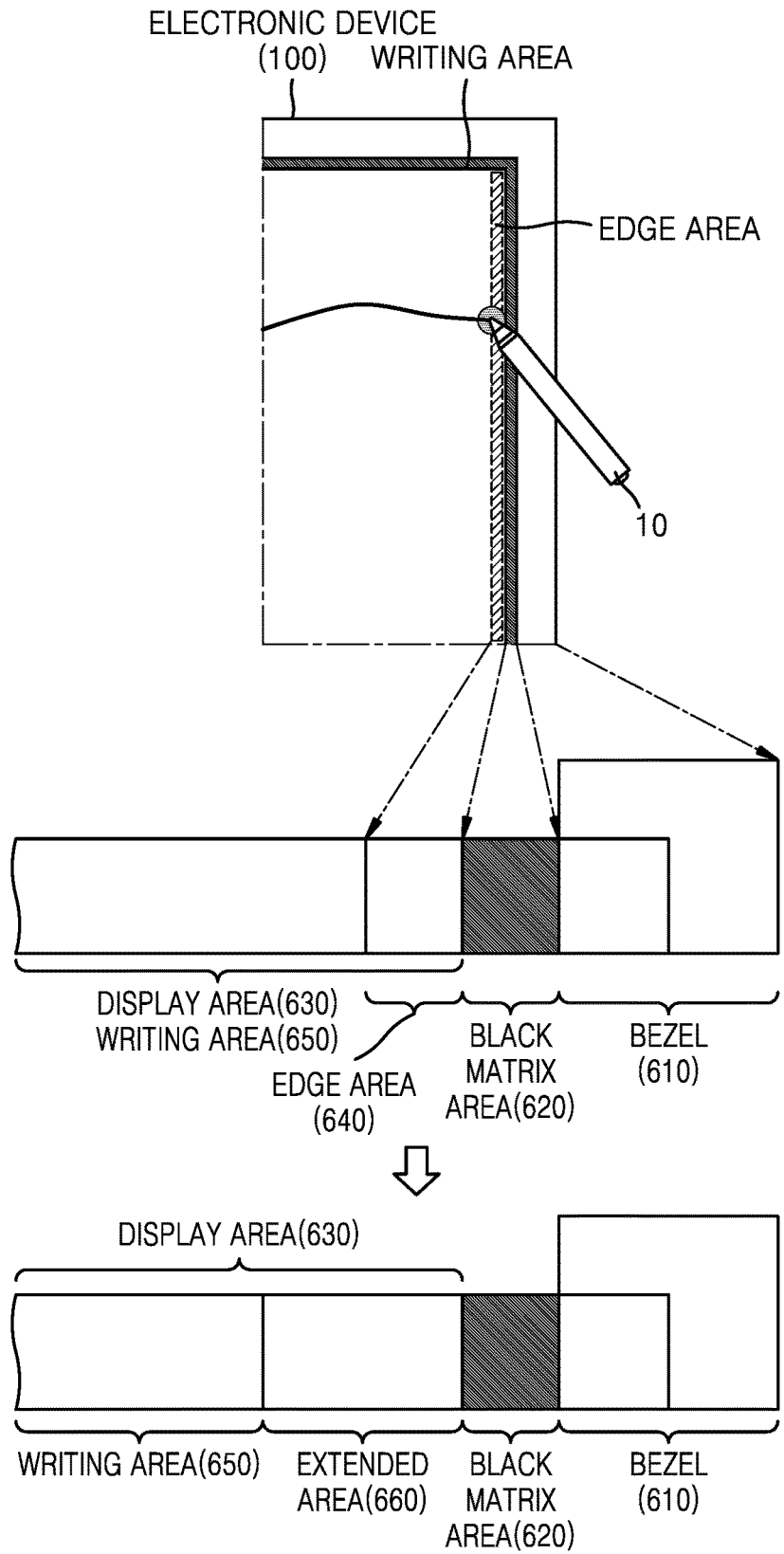
FIG. 6 is a schematic diagram illustrating an edge area for receiving a predefined touch input according to an embodiment.

FIG. 6 is a reference view illustrating an edge area for receiving a predefined touch input according to an embodiment.

Referring to FIG. 6, a bezel 610 may be positioned along edges of a display panel of the electronic device 100, and a black matrix area 620 may be provided close to the bezel 610. The remaining area of the display panel except for the black matrix area 620 may be a display area 630 that may be used as a writing area.

That is, the display panel may define the display area 630 as the writing area. In the display area 630 defined in the display panel, a writing area for a writing input may be displayed. For example, when the writing area is initially used, a writing area 650 may be displayed in the entire display area 630.

When a predefined touch input is detected, the electronic device 100 may provide an extended area 660. That is, when the electronic device 100 receives a predefined touch input, the electronic device 100 may reduce the writing area 650, and provide the extended area 660 that continues from the reduced writing area 650, thereby enabling additional writing input in an area of the display 630 excluding the reduced writing area 650.

In an edge of the writing area 650, an edge area 640 may be provided to receive the predefined touch input.

A size of the edge area 640 may be determined appropriately according to a system configuration. When the electronic device 100 receives the predefined touch input made in the edge area 640, the electronic device 100 may use the predefined touch input as a trigger signal for providing the extended area 660.

The edge area 640 may be provided at any location of the writing area 630. However, when the edge area 640 is positioned at an edge of the writing area 630, it may be possible to prevent the extended area 660 from being provided against the user's intention. For example, when the predefined touch input is a long press, the user may unintentionally input a long press in a center part of the writing area 650 while making a writing input in the center part of the writing area. In this case, when the electronic device 100 provides the extended area 660, the user may be experience inconvenience due to an abrupt reduction in size of writing content or a provision of the extended area 660 against the user's intention. Accordingly, by providing an edge area for receiving a predefined touch input in a portion of edges of a writing area and providing an extended area when a user makes the predefined touch input in the edge area provided in an edge of the writing area, an extended area providing function may be more stably implemented. However, providing an edge area in a portion of edges of a writing area is only an example, and the edge area may be provided at any other location of the writing area according to implementation.

The electronic device 100 may provide an extended area in response to a detection of a predefined touch input in an edge area of a writing area displayed on a display of the electronic device. The predefined touch input as a trigger signal for providing an extended area may be one of various types of inputs, designated by the electronic device 100.

For example, the predefined touch input may include a long press which is a touch input maintained for a predefined time at a certain location of the edge area. For example, when a touch input signal is maintained without interruption for a predefined time or more at a certain location of the edge area, the electronic device 100 may detect the touch input signal as the predefined touch input.

For example, the predefined touch input may include a touch input that is continuously sensed in a predefined short time. For example, the predefined touch input may include a double tap corresponding to two touch inputs made successively for a short time in the edge area. However, the two touch inputs may be an example, and the number of touch inputs made successively may be three or four. That is, the number of touch inputs made successively may be appropriately determined.

For example, the predefined touch input may include a case in which pressure of a touch input sensed at a certain location in the edge area exceeds a threshold value. For example, when the touch sensitive display is capable of sensing pressure, a touch input which is made in the edge area and of which pressure exceeds a threshold value may be used as the predefined touch input.

Also, the predefined touch input may be an input corresponding to a predefined symbol that is detected in the edge area. For example, when a user makes an input of drawing a predefined figure in the edge area, the electronic device 100 may use the input of drawing the predefined figure that is detected in the edge area as the predefined touch input. The predefined figure may be one of various shapes including a circle, a quadrangle, a star shape, etc.

Also, the electronic device 100 may use a parameter value for the predefined touch input to determine a size of an extended area. That is, the electronic device 100 may provide an extended area having a large size when a parameter value related to the predefined touch input is greater, and when the parameter value related to the predefined touch input is smaller, the electronic device 100 may provide an extended area having a smaller size.

For example, when the predefined touch input is a long press which is a touch input maintained for a predefined time or more, the electronic device 100 may determine a size of an extended area according to a duration time of the touch input. When the duration time of the touch input, that is, a duration time of the press is long, the electronic device 100 may provide an extended area having a large size, and when the duration time of the press is short, the electronic device 100 may provide an extended area having a small size.

For example, when the number of touch inputs sensed successively within a predefined short time is used as the predefined touch input, the electronic device 100 may determine a size of an extended area according to the number of touch inputs. For example, when the number of touch inputs is small, the electronic device 100 may provide an extended area having a small size, and when the number of touch inputs is great, the electronic device 100 may provide an extended area having a large size.

For example, when a touch input of which pressure exceeds predefined pressure is used as the predefined touch input, the electronic device 100 may determine a size of an extended area according to pressure of a touch input. For example, when pressure of a touch input is low, the electronic device 100 may provide an extended area having a small size, and when pressure of a touch input is high, the electronic device 100 may provide an extended area having a large size.

Figure 7:
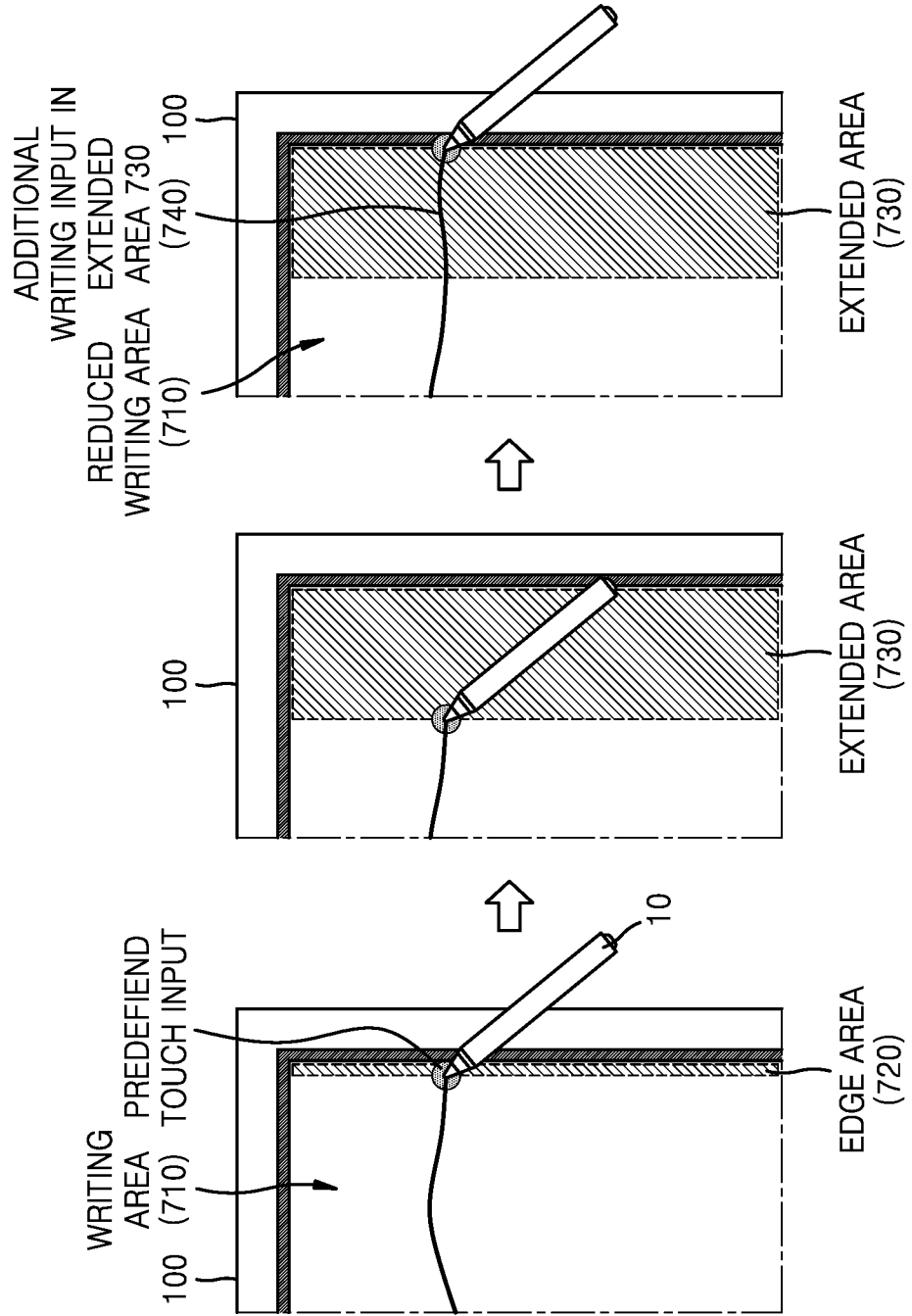
FIG. 7 is a schematic diagram illustrating an example of a method for providing an extended area according to an embodiment.

FIG. 7 is a schematic diagram illustrating an example of a method for providing an extended area according to an embodiment.

Referring to FIG. 7, when a user makes a writing input in a writing area 710 displayed on the display of the electronic device 100 until arriving at a right edge of the writing area 710 and determines that a space for the writing input is insufficient at the right edge of the writing area 710, the user may make a predefined touch input in an edge area 720. For example, when the predefined touch input is a long press and the user maintains a touch input of touching the edge area 720 with the pen 10 for a predefined time or more, the electronic device 100 may detect the touch input maintained for the predefined time or more in the edge area 720, recognize the touch input as the user's intention to extend the writing area 710. According to an embodiment, the electronic device 100 may reduce the writing area 710, and provide an extended area 730 in a space generated when the writing area 710 is reduced.

When the extended area 730 is provided, the user may make an additional writing input 740 through the extended area 730.

Figure 8:
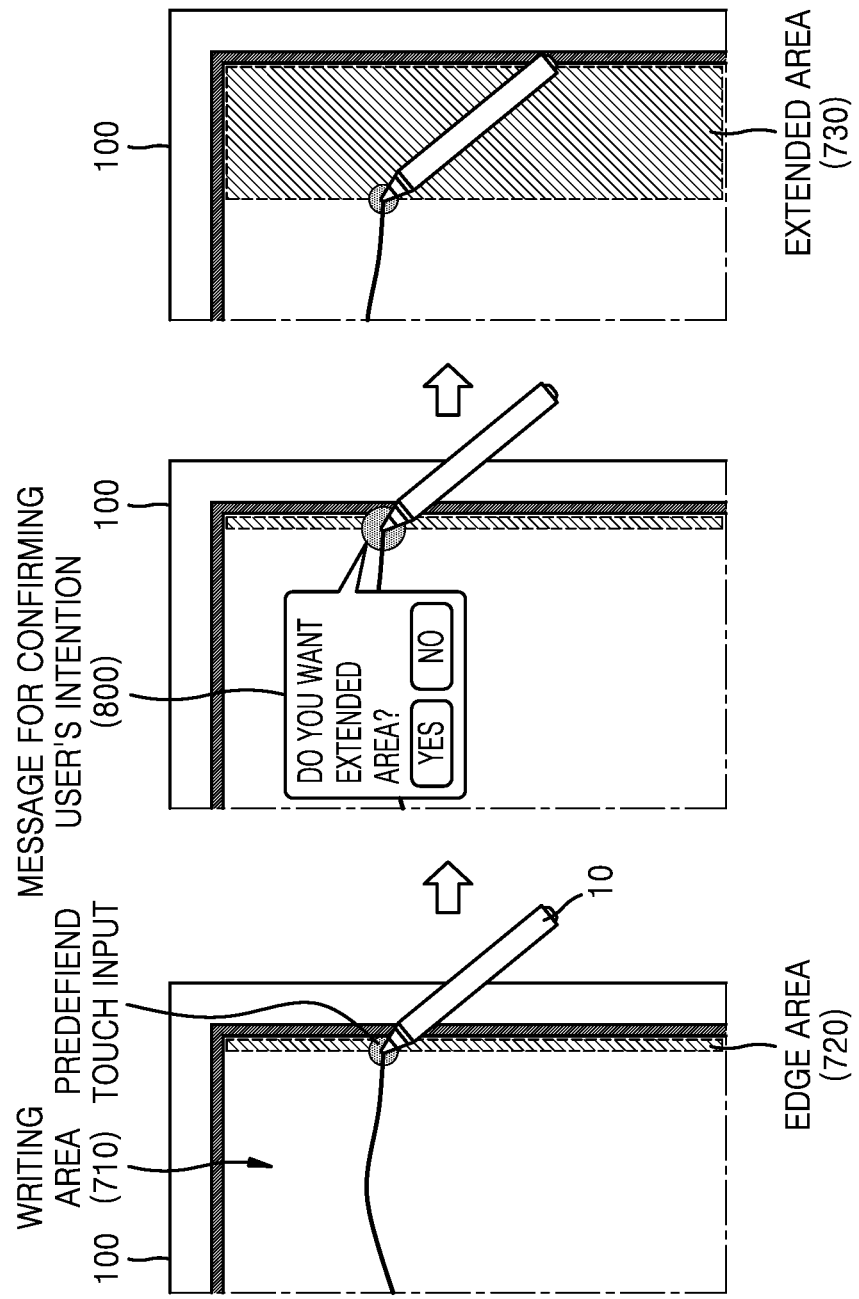
FIG. 8 is a schematic diagram illustrating an example of a method of confirming a user's intention when an extended area is provided according to an embodiment.

FIG. 8 is a schematic diagram illustrating an example of a method for confirming a user's intention when an extended area is provided according to an embodiment.

FIG. 8 shows an example of inquiring about a user's intention when a predefined touch input is detected in an edge area, instead of directly providing an extended area when the predefined touch input is detected in the edge area, to reliably prevent the extended area from being provided against the user's intention.

Referring to FIG. 8, when a user makes a writing input in the writing area 710 displayed on the display of the electronic device 100 until arriving at a right edge of the writing area 710 and determines that a space for the writing input is insufficient at the right edge of the writing area 710, the user may make a predefined touch input in the edge area 720. For example, when the predefined touch input is a long press and the user maintains a touch input of touching the edge area 720 with the pen 10 for a predefined time, the electronic device 100 may detect the touch input maintained for the predefined time in the edge area 720, and display a message 800 for confirming the user's intention in response to the touch input to confirm the user's intention for generating an extended area. For example, the message 800 may be <Do You Want Extended Area? Yes or No>. When the electronic device 100 receives an input corresponding to <Yes> from the user in response to the message 800, the electronic device 100 may provide an extended area 730, and when the electronic device 100 receives an input corresponding to <No> from the user, the electronic device 100 may ignore the previously received predefined touch input and take no action.

FIG. 9A is a reference view illustrating a method for providing an extended area according to an embodiment.

Referring to 900A of FIG. 9A, a writing area 920 may be displayed in a display area 910. The writing area 920 may be a target area of a current writing input. A size of a page may be generally determined to correspond to a size of a display, and a page displayed on the display may be provided as a writing area. Therefore, when a page that is used in the electronic device 100 has a height of H and a width of W, the writing area 920 may also have a height of H and a width of W.

The electronic device 100 may define an edge area (also, referred to as a right edge area) 930 for detecting a predefined touch input made by a user in a portion of the writing area 920. When the electronic device 100 detects the predefined touch input in the defined edge area 930, the electronic device 100 may recognize the predefined touch input as a trigger for providing an extended area.

The user may make a writing input in the writing area 920, and when the user determines that a space for the writing input is insufficient while making the writing input, the user may make the predefined touch input in the edge area 930.

Then, the electronic device 100 may detect the predefined touch input in the edge area 930, and the electronic device 100 may determine that the user requires an extended area and provide an extended area.

According to a method for providing an extended area, as shown in 900B, the electronic device 100 may reduce the size W*H of the writing area 920 to W1*H1 and display a reduced writing area 920' while providing the remaining area (that is, an area based on H1', H1", and W1') of the display area 910 as an extended area 940.

According to a method for reducing the size of the writing area 920, the electronic device 100 may define a reference point that is relative to a location of the predefined touch input, and reduce the writing area 920 based on the reference point. The reference point may be determined to be at various relative locations with respect to the predefined touch input, which will be described with reference to FIGS. 10A and 10B.

As shown in 900A, when a user makes a writing input until arriving at a right end of the display area 910 and determines that a space for the writing input is insufficient, an extended area 940a (also, referred to as a first extended area 940a) may need to be provided to the right of the writing area 920. However, to reduce the writing area 920 while maintaining horizontal and vertical portions of writing content input by the user without distorting the writing content, both the width and height of the writing area 910 may need to be reduced. Accordingly, extended areas 940b and 940c (also, referred to as first extended areas 940b and 940c) may be provided above and below the reduced writing area 920'.

As such, the electronic device 100 may reduce the size of the writing area 920 and provide the first extended areas 940a, 940b, and 940c to enable the user to make an additional writing input in the first extended areas 940a, 940b, and 940c.

Referring to FIG. 900B, after the first extended areas 940a, 940b, and 940c are provided, the display area 910 may be configured with the reduced writing area 920' and the first extended areas 940a, 940b, and 940c.

According to an embodiment, an operation of adding an extended area may be performed two times or more.

For example, referring to 900C, when an operation of adding an extended area, as shown in 900B, is performed to display a writing area 950, the electronic device 100 may detect the predefined touch input in an edge area 960. In this case, the electronic device 100 may provide a second extended area.

Referring to 900D, the electronic device 100 may reduce a size W*H of the writing area 950 to W2*H2 to display a reduced writing area 950', while providing areas (that is, areas based on H2', H2", and W2') generated by reducing the size W*H of the writing area 950 as second extended areas 970a, 970b, and 970c.

Figure 9B:
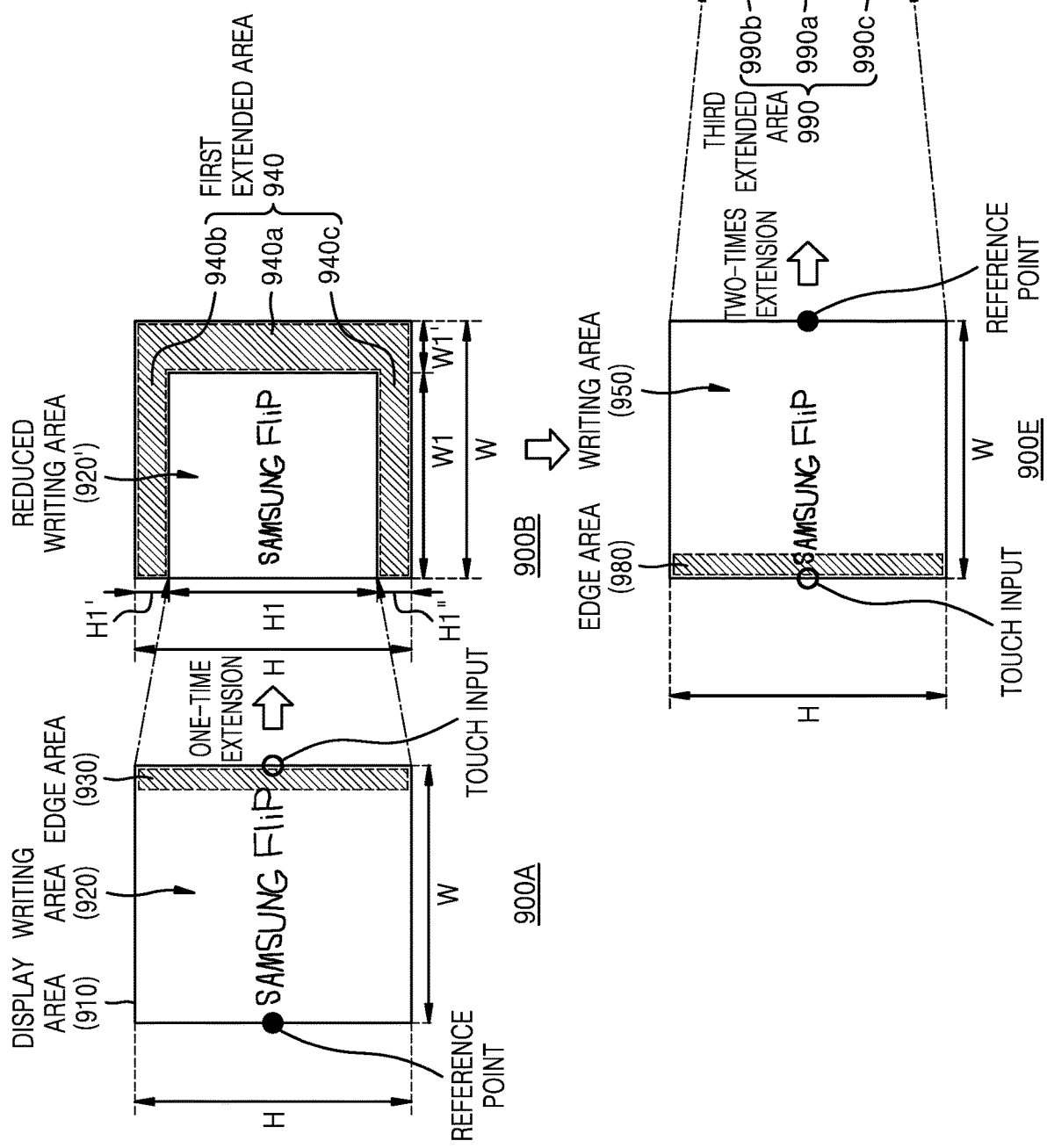
FIG. 9B is a reference view illustrating a method of providing an extended area according to an embodiment.

FIG. 9B is a reference view illustrating a method for providing an extended area according to an embodiment.

In an example shown in FIG. 9B, first extended areas may be provided at the same locations as the first extended areas 940a, 940b, 940c in an example shown in FIG. 9A, whereas second extended areas may be provided at different locations from the second extended areas 970a, 970b, and 970c in the example shown in FIG. 9A.

900A and 900B of FIG. 9B are the same as 900A and 900B of FIG. 9A, and therefore, descriptions thereof will be omitted.

Referring to 900E, when an operation of adding an extended area, as shown in 900B, is performed to display the writing area 950, the electronic device 100 may detect the predefined touch input in an edge area 980 (that is, a left edge area 980) located at a left side of the writing area 950. In this case, the electronic device 100 may provide a second extended area.

Because the predefined touch input is detected in the left edge area 980, the electronic device 100 may define a reference point that is relative to a location of the predefined touch input, and reduce the writing area 950 based on the reference point.

Referring to 900F, the electronic device 100 may reduce the size W*H of the writing area 950 to W2*H2 to display a reduced writing area 950', while providing areas (that is, areas based on H2', H2", and W2') generated by reducing the size of the writing area 950 as second extended areas 990a, 990b, and 990c.

In the example shown in FIG. 9A, because all the predefined touch inputs are detected in the right edge area 930, all the first extended areas 940a, 940b, and 940c and the second extended areas 970a, 970b, and 970c may be provided to the right of the writing areas 920' and 950'. However, in the example shown in FIG. 9B, the predefined touch input may be detected in the right edge area 930 so that the first extended areas 940a, 940b, and 940c are provided to the right of the writing area 920', however, a second predefined touch input may be detected in the left edge area 980 so that the second extended areas 990a, 990b, and 990c may be provided to the left of the writing area 950'.

The embodiments of the disclosure provide an extended area in response to a detection of a predefined touch input in an edge area of a writing area displayed on a display of an electronic device, and prepare a space for the extended area by reducing the writing area. The reduced writing area may be positioned at one of various locations of a display area. Also, the writing area that is to be reduced may be a page or a roll being a group of pages. FIGS. 10A and 10B show an example of reducing a writing area in unit of a page for convenience of description.

FIG. 10A is a reference view illustrating a method for reducing a writing area and positioning the reduced writing area according to an embodiment.

Referring to 1000A of FIG. 10A, when a predefined touch input 1020 is detected in a right edge portion of a writing area 1000, the writing area 1000 may be reduced to a writing area 1010 based on a reference point 1030 of a left edge portion that is symmetrical to a location of the predefined touch input 1020. For example, a y-axis coordinate of the reference point 1030 may be equal to a y-axis coordinate of the location of the predefined touch input 1020, and an x-axis coordinate of the reference point 1030 may be a coordinate value located in the left edge portion of the writing area 1010. As such, by reducing the writing area 1010 based on the reference point 1030, the reduced writing area 1010 may be located with respect to the reference point 1030, as shown in 1000B, so that an extended area 1040 may be provided to upper, right, and lower sides of the reduced writing area 1010.

Referring to 1000C of FIG. 10A, when the predefined touch input 1020 is detected in a right, upper edge portion of the writing area 1010, the writing area 1010 may be reduced based on a reference point 1030 of a left, lower edge portion which is symmetrical to a location of the predefined touch input 1020. Here, the writing area 1010 is reduced based on the reference point 1030 that is diagonally symmetrical to the location of the predefined touch input 1020 because a detection of the predefined touch input 1020 in the right, upper edge portion provides that there is a high probability that a user's additional writing input will be made in an upper-right direction, instead of a right direction or an upper direction. Accordingly, by reducing the writing area 1010 based on the reference point 1030 to provide extended areas to the right and upper sides of the writing area 1010, extended areas may be provided to the upper and right sides of the reduced writing area 1010, as shown in 1000D. An upper extended area 1050 shown in 1000D may be larger than an upper extended area shown in 1000B.

FIG. 10B is a reference view illustrating a method for reducing a writing area and positioning the reduced writing area, according to an embodiment.

Referring to 1000E of FIG. 10B, when a predefined touch input 1020 is detected in an upper edge portion of a writing area 1010, the writing area 1010 may be reduced based on a reference point 1030 of a lower edge portion that is relative to a location of the predefined touch input 1020. For example, coordinates of the reference point 1030 may be coordinate values of a center of a lower edge of a page corresponding to the writing area 1010. As such, by reducing the writing area 1010 based on the reference point 1030, the reduced writing area 1010 may be positioned based on the reference point 1030, as shown in 1000F, so that an extended area 1050 may be provided above the reduced writing area 1010. Defining the reference point 1030 as the coordinate values of the center of the lower edge of the page, as shown in 1000E, may be an example, and because the predefined touch input 1020 is detected in the upper edge portion of the writing area 1010, the reference point 1030 may have any coordinates on the lower edge of the page as long as the extended area 1050 is provided above the writing area 1010.

Referring to 1000G of FIG. 10B, when the predefined touch input 1020 is detected in a lower edge portion of the writing area 1010, the writing area 1010 may be reduced based on a reference point 1030 of a upper edge portion that is relative to a location of the predefined touch input 1020. For example, coordinates of the reference point 1030 may be coordinate values of a center of an upper edge of a page corresponding to the writing area 1010. Here, the writing area 1010 may be reduced based on the reference point 1030 located on the upper edge of the page corresponding to the writing area 1010 because a detection of the predefined touch input 1020 in the lower edge portion provides that there is a high probability that a user's additional writing input will be made in a downward direction. Accordingly, as shown in 1000H, by reducing the writing area 1010 based on the reference point 1030 to provide an extended area below the writing area 1010, an extended area 1060 may be provided below the reduced writing area 1010 as shown in 1000D.

The embodiments provide an extended area in response to a detection of a predefined touch input in an edge area of a writing area displayed on a display of an electronic device, and prepare a space for the extended area by reducing the writing area. The writing area that is to be reduced may be a roll, a page, or an object. Hereinafter, cases in which areas that are to be reduced are a roll, a page, and an object will be described respectively. Whether to determine an area to be reduced as a roll, a page, or an object may have been set in advance in the electronic device 100 or may be set according to a user input.

Figure 11:
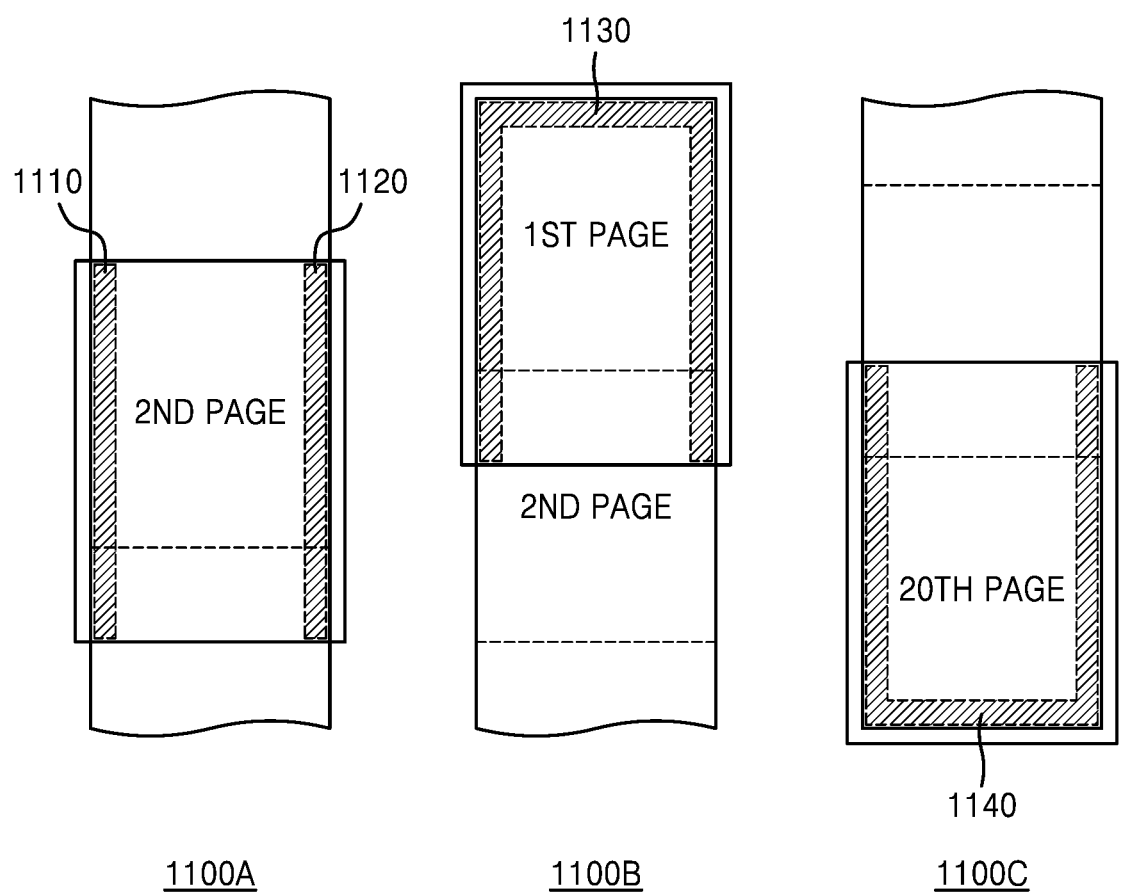
FIG. 11 is a reference view illustrating locations to which an extended area may be provided according to an embodiment.

FIG. 11 is a reference view illustrating locations to which an extended area may be provided according to an embodiment.

Referring to 1100A of FIG. 11, an extended area may be provided at a left edge 1110 or a right edge 1120 of a writing area. For example, when a user wants to make an additional writing input at the left edge 1110 of the writing area, the user may make a predefined touch input at the left edge 1110 of the writing area, and then, the electronic device 100 may provide an extended area at the left edge 1110. Likewise, for example, when the user wants to make an additional writing input at the right edge 1120 of the writing area, the user may make the predefined touch input at the right edge 1120 of the writing area, and the electronic device 100 may provide an extended area at the right edge 1120. When a page currently displayed on a display of the electronic device 100 is a middle portion (for example, a $2^{nd}$ page) of a roll, the page may be connected to other pages at its upper and lower ends so that the other pages connected to the page may be used although no extended area is provided. In this case, a need for a provision of an extended area may be reduced.

Referring to 1100B of FIG. 11, when a page currently displayed on the display of the electronic device 100 is a $1^{st}$ page of a roll, a user may want to make a writing input at an upper edge 1130 of the $1^{st}$ page. In this case, the electronic device 100 may provide an extended area at the upper edge 1130 of the $1^{st}$ page.

Referring to 1100C of FIG. 11, when a page currently displayed on the display of the electronic device 100 is a final page (for example, a $20^{th}$ page of a roll configured with 20 pages) of a roll, a user may want to make a writing input downward at a lower edge 1140 of the $20^{th}$ page. In this case, the electronic device 100 may provide an extended area at the lower edge 1140 of the $20^{th}$ page.

According to the embodiments, when a writing area is reduced according to a detection of a predefined touch input in an edge area of the writing area, a range of the reduced writing area may be determined to be one of various ranges. For example, a range of the reduced writing area may be a roll, a page, or an object.

Figure 12:
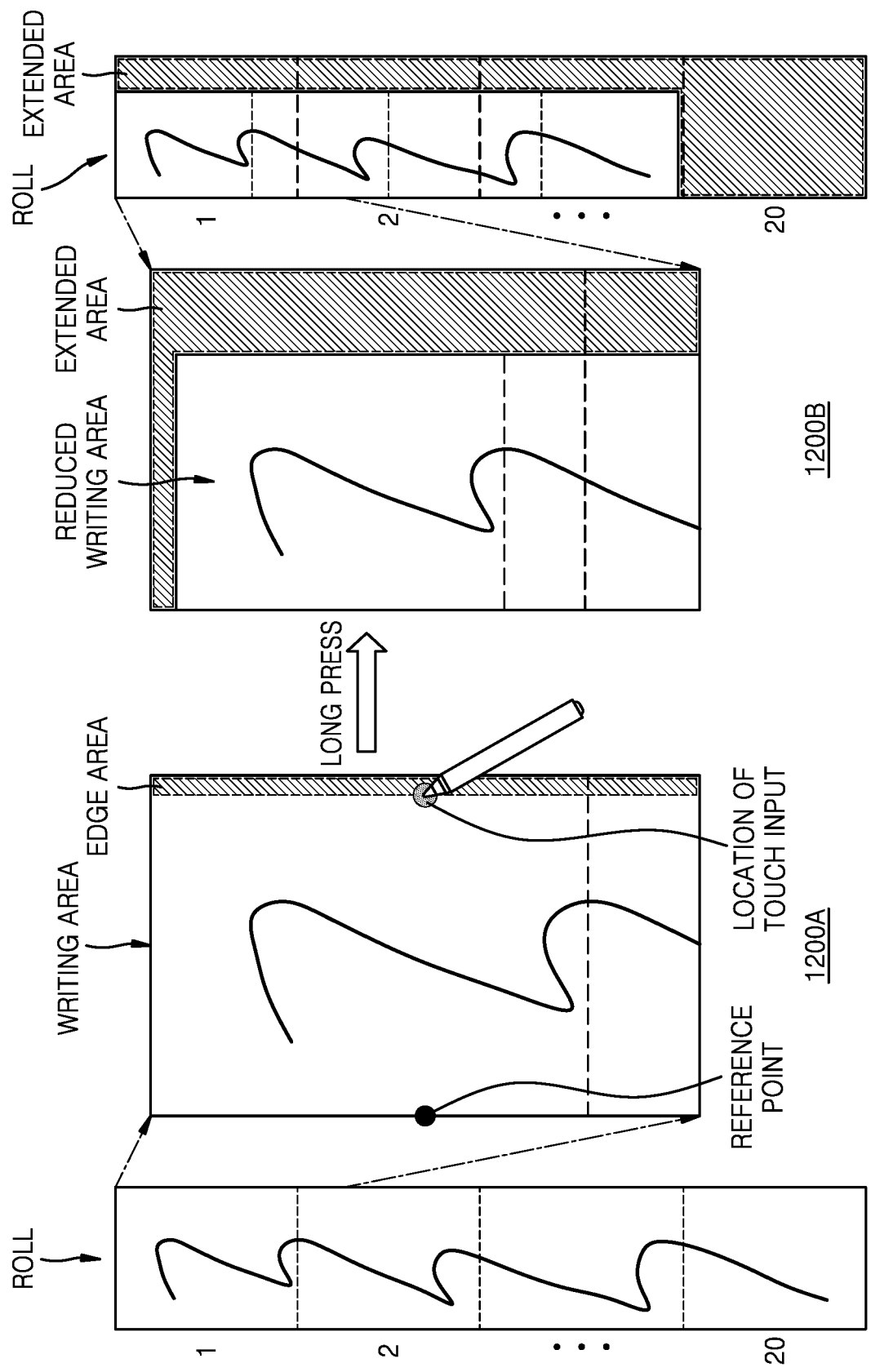
FIG. 12 is a reference view illustrating an example of reducing a writing area in units of rolls according to an embodiment.

FIG. 12 is a reference view illustrating an example of reducing a writing area in unit of a roll according to an embodiment.

Referring to 1200A of FIG. 12, a roll may be configured with 20 pages, and a writing area of a display may display a $1^{st}$ page and an upper portion of a $2^{nd}$ page. When the electronic device 100 detects a predefined touch input (for example, a long press) made by a user in an edge area, the electronic device 100 may reduce a writing area of the entire roll based on a reference point which is symmetrical to a location of the long press.

Referring to 1200B of FIG. 12, a case in which the writing area of the entire roll is reduced and an extended area is provided in an area generated by reducing the writing area is shown. The operation of reducing the writing area of the entire roll and providing the extended area may be applied to the entire roll. Because the entire roll is reduced, writing content of the writing area may be reduced in size and shown without interruption in the display of the electronic device 100.

Figure 13:
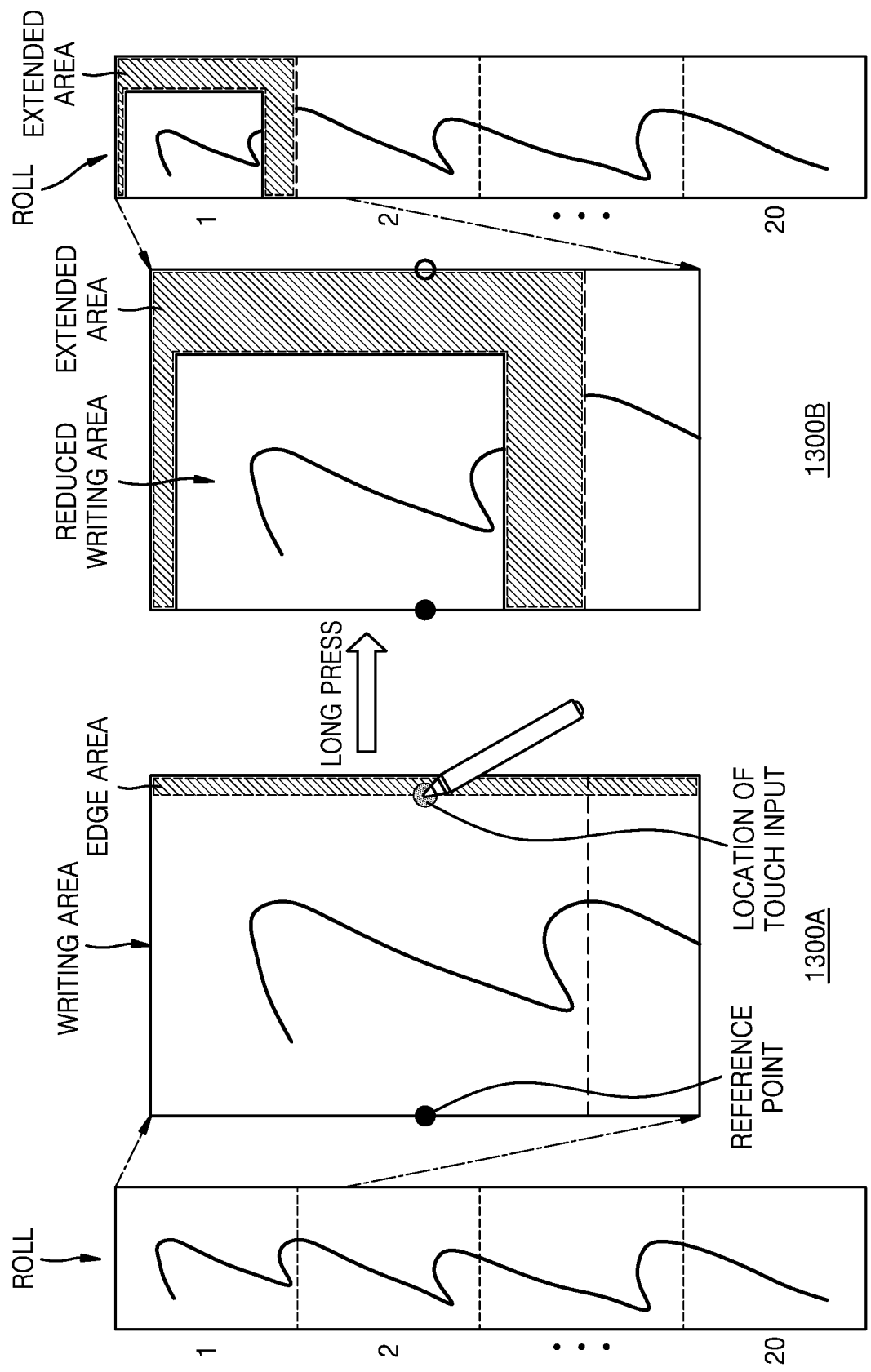
FIG. 13 is a reference view illustrating an example of reducing a writing area in units of pages according to an embodiment.

FIG. 13 is a reference view illustrating an example of reducing a writing area in unit of a page according to an embodiment.

Referring to 1300A of FIG. 13, a roll may be configured with 20 pages, and a writing area of a display may display a $1^{st}$ page and an upper portion of a $2^{nd}$ page. When the electronic device 100 detects a predefined touch input (for example, a long press) made by a user in an edge area, the electronic device 100 may reduce a writing area of the corresponding page based on a reference point which is symmetrical to a location of the long press.

Referring to 1300B of FIG. 13, a case in which a writing area of a current page is reduced and an extended area is provided in the remaining area of the page generated by reducing the writing area is shown. Because the current page, not the entire roll, is reduced, the writing area of the current page, that is, the $1^{st}$ page may be reduced, an extended area may also be provided for the $1^{st}$ page, and the $2^{nd}$ page may not change in the display of the electronic device 100. In view of the roll, the writing area of the $1^{st}$ page of the roll may be reduced, the extended area may be provided for the $1^{st}$ page, and the $2^{nd}$ to $20^{th}$ pages may be maintained at their original states without a reduction of their writing areas or a provision of extended areas.

For example, when a user executes a function (for example, a canvas mode) of drawing a picture by using the electronic device 100, an extended area may be provided in unit of a page, instead of in unit of a roll.

Figure 14:
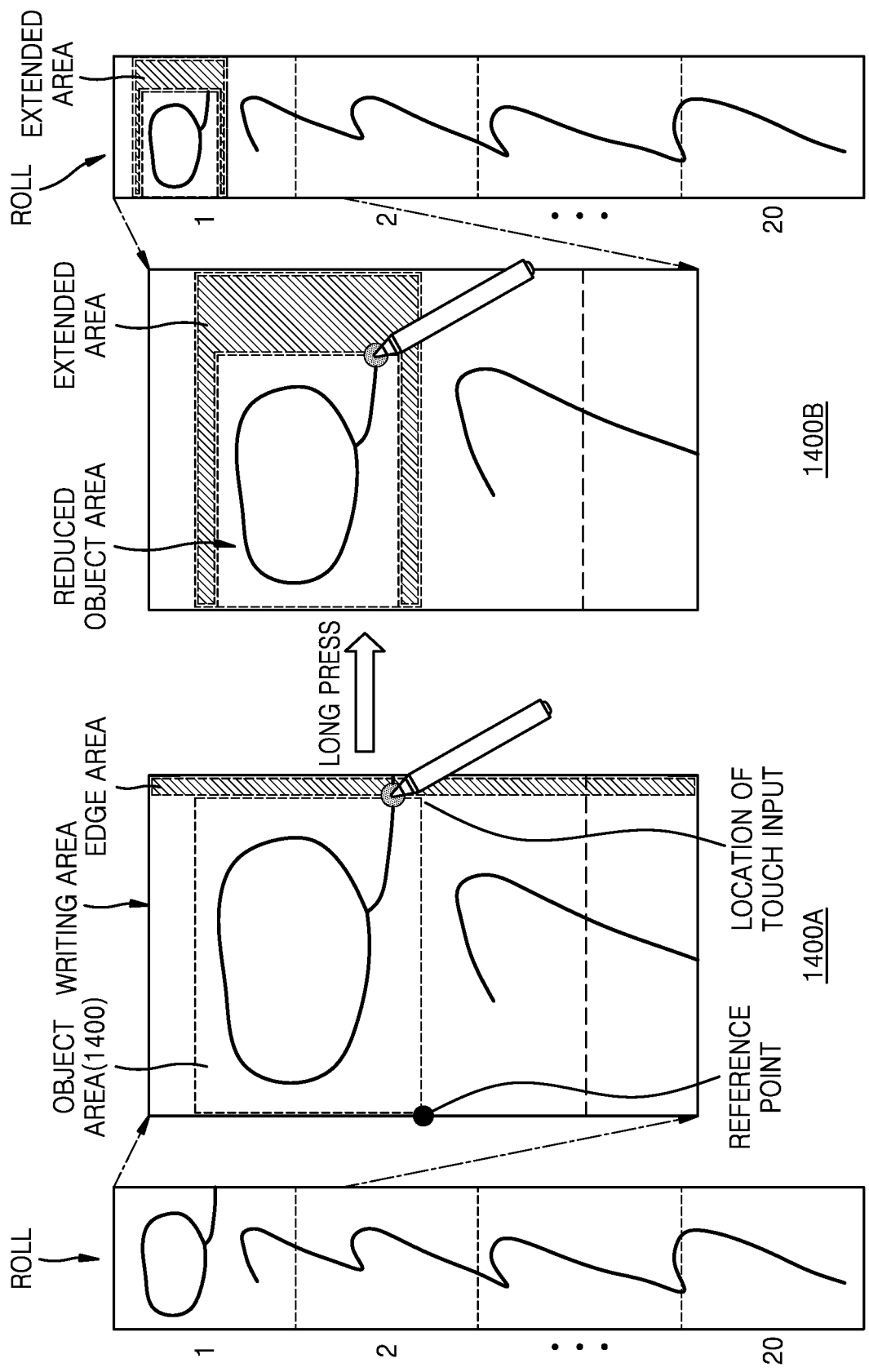
FIG. 14 is a reference view illustrating an example of reducing a writing area in units of objects according to an embodiment.

FIG. 14 is a reference view illustrating an example of reducing a writing area in unit of an object according to an embodiment.

Referring to 1400A of FIG. 14, a roll may be configured to 20 pages, and a writing area of a display may display a $1^{st}$ page and an upper portion of a $2^{nd}$ page. When a user makes a writing input in the writing area and determines that a space for the writing input is insufficient, the user may make a predefined touch input in an edge area. When the electronic device 100 detects the predefined touch input in the edge area, the electronic device 100 may detect an object area 1400 related to the predefined touch input.

The object area 1400 may be, for example, an area including an object related to the predefined touch input, as shown in 1400A of FIG. 14. Alternatively, the object area 1400 may be, for example, an area including an object connected to the predefined touch input by handwriting, or an area including an object being within a certain distance from the predefined touch input.

The electronic device 100 may reduce the detected object area 1400 in the roll, and provide an extended area in a space generated by reducing the object area 1400.

Referring to 1400B of FIG. 14, writing content corresponding to the object area 1400 in the writing area included in a current page may be reduced, the extended area may be provided around the reduced writing content, and the remaining area not corresponding to the object area 1400 although being included in the current page may not change. Because the writing content included in the object area, neither the entire roll nor the entire page, is reduced, the writing content of the object area 1400 included in the current page (that is, the $1^{st}$ page) may be reduced, the extended area may also be provided for the object area 1400, and the $2^{nd}$ page may not change in the display of the electronic device 100. In view of the roll, the writing content of the object area 1400 included in the $1^{st}$ page of the roll may be reduced, the extended area may be provided for the object area 1400 of the $1^{st}$ page, and the $2^{nd}$ to $20^{th}$ pages may be maintained at their original states without a reduction of their writing contents or a provision of extended areas.

Figure 15:
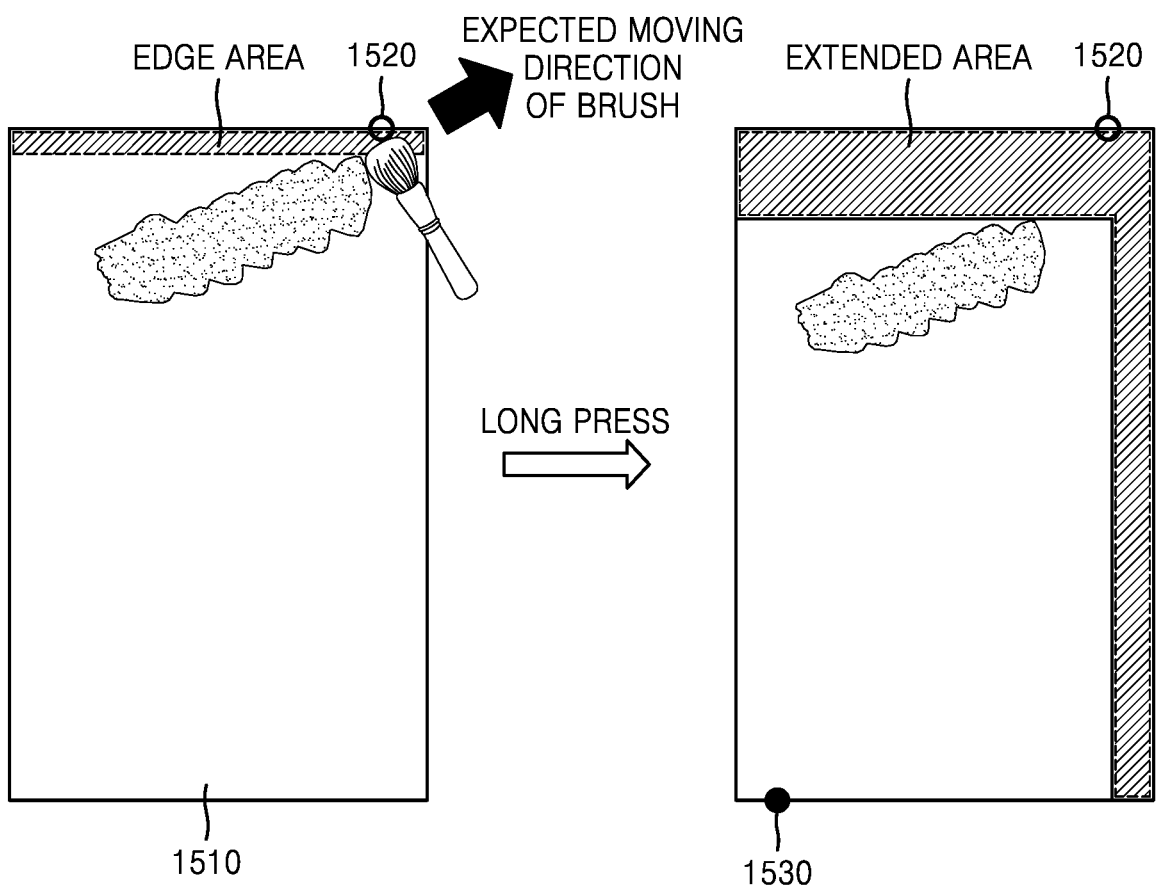

FIG. 15 is a reference view illustrating a provision of an extended area in an example of writing using a brush according to an embodiment.

The electronic device 100 may provide an interface in which a user draws a picture with an actual brush as input means, instead of a finger or pen.

Referring to FIG. 15, when a user draws a picture with an actual brush in a canvas mode, determines that a space for the drawing is insufficient at an upper edge of a writing area 1510, the user may make a predefined touch input 1520 at the upper portion of the writing area 1510. Based on the predefined touch input 1520, the electronic device 100 may determine a reference point 1530 that is relative to a location of the predefined touch input 1520. The reference point 1530 may be located at a left portion of a lower edge, which is diagonally symmetrical to the location of the predefined touch input 1520. The reason for determining the reference point 1530 may be to reduce the writing area 1510 based on the reference point 1530 located at the left portion of the lower edge to provide an extended area to the right of the reduced writing area 1510, as well as in the upward direction of the reduced writing area 1510, because, when the location of the predefined touch input 1520 is biased to the right portion of the upper edge, there is a high probability that an expected moving direction of the brush will be an upper-right direction.

Figure 16:
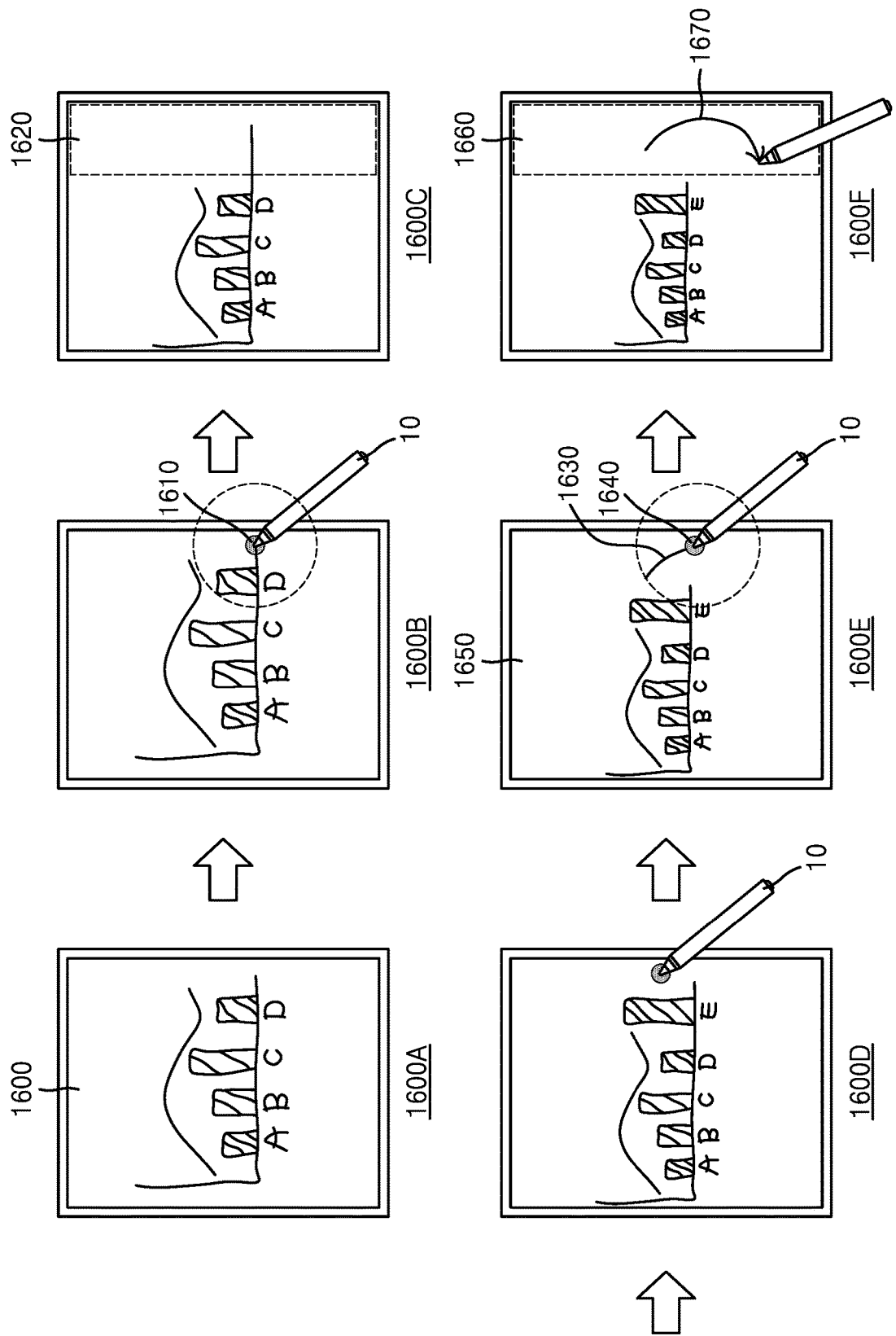
FIG. 16 is a reference view illustrating a scenario for providing an extended area according to an embodiment.

FIG. 16 is a reference view illustrating a scenario for providing an extended area according to an embodiment.

Referring to FIG. 16, writing content showing bar graphs A, B, C, and D may be included in a writing area 1600 of a display of the electronic device 100 (1600A).

When a user wants to make an additional writing input in a right side of the bar graph D and determines that a space for the additional writing input is insufficient in the right side of the bar graph D, the user may make a predefined touch input 1610 in an edge area of the writing area 1600 by using the pen 10 to create additional space for the additional writing input according to the embodiments described above (1600B).

When the electronic device 100 detects the predefined touch input 1610, the electronic device 100 may reduce the writing area 1600 to pull the reduced writing area 1600 to the left and display the reduced writing area 1600, and provide an extended area 1620 to the right of the reduced writing area 1600 (1600C).

Accordingly, the user may additionally write a bar graph E next to the bar graph D in the extended area 1620 (1600D).

Also, when the user makes an additional writing input 1630 in a right side of the bar graph E and again determines that a space for the additional writing input 1630 is insufficient, the user may make a predefined touch input 1640 in an edge area of a writing area 1650 (1600E).

When the electronic device 100 detects the predefined touch input 1640, the electronic device 100 may reduce the writing area 1650 to pull the reduced writing area 1650 to the left and display the reduced writing area 1650, and provide a second extended area 1660 to the right of the reduced writing area 1650. The user may make his/her desired additional writing input 1670 in the second extended area 1660 (1600F).

The embodiments of the disclosure relate to a method by which the electronic device 100 reduces, when detecting a predefined touch input in an edge area of a writing area, the writing area to provide an extended area. However, according to an embodiment, a method of adding an extended area without reducing a writing area may also be provided. In the method of adding an extended area without reducing a writing area, a writing input space may be expanded without reducing existing writing content, although the entire page is not displayed on a screen of a display area because the size of the page is substantially enlarged.

The electronic device and the operation method thereof, according to the embodiments of the disclosure, may be implemented in a program command form that can be executed by various computer means, such as one or more processors, and may be recorded on computer-readable media. The computer-readable media may also include, alone or in combination with program commands, data files, data structures, and the like. The program commands recorded in the media may be specifically designed and constructed for the purposes of implementing the embodiments of the disclosure or may include generally well-known and available to those of ordinary skill in the art. Examples of the computer-readable media include magnetic media, such as hard disks, floppy disks, and magnetic tapes, optical media, such as CD-ROM and DVD, magneto-optical media such as floptical disks, and hardware devices, such as ROM, RAM, flash memory, and the like, specifically configured to store and execute program commands. Examples of the program commands include high-level language codes that can be executed on a computer through an interpreter or the like, as well as machine language codes produced by a compiler.

According to the embodiments of the disclosure, a user of the electronic device may easily expand a writing input interface through a simple control.

Although the embodiments of the disclosure have been described in detail, the scope of the disclosure is not limited to these embodiments of the disclosure. It will be understood that various modifications and variations may be made by those skilled in the art based on the concept of the disclosure as defined by the appended claims.

What is claimed is:

1. An electronic device comprising:
 a display;
 a touch input interface;
 a memory storing at least one instruction; and
 a processor configured to execute the at least one instruction stored in the memory to:
  display a writing area in a display area of the display;
  detect a predefined touch input in the writing area;
  identify a parameter value corresponding to the predefined touch input, the parameter value corresponding to the predefined touch input comprising at least one of a duration time of the predefined touch input, a pressure corresponding to the predefined touch input, or a number of times of the predefined touch input;
  determine a size of an extended area according to the parameter value, and
  based on detecting the predefined touch input, reduce the writing area, display the reduced writing area in at least first part of the display area and provide the extended area having the size determined according to the parameter value in at least second part of the display area, the extended area being configured to receive a writing input continuing from the reduced writing area.

2. The electronic device of claim 1, wherein the predefined touch input comprises at least one of a touch input for a first predefined time or more in the writing area, a touch input made repeatedly for a second predefined time in the writing area, or a touch input of which pressure exceeds a threshold value in the writing area.

3. The electronic device of claim 1, wherein the processor is further configured to execute the at least one instruction to:
 provide a user interface for confirming whether the extended area is to be provided in the display area in response to the detection of the predefined touch input; and
 based on receiving a user input in the user interface, provide the extended area.

4. The electronic device of claim 1, wherein the processor is further configured to execute the at least one instruction to:
 based on the detection of the predefined touch input, reduce the writing area in each page among a plurality of pages included in a document, wherein a first page among the plurality of pages is an execution target of a current touch input, and
 provide the extended area by applying the extended area to the plurality of pages in the document.

5. The electronic device of claim 1, wherein the processor is further configured to execute the at least one instruction to:
 based on the detection of the predefined touch input, reduce the writing area included in a current page among a plurality of pages in a document, the current page being an execution target of a current touch input, and
 provide the extended area by applying the extended area to the current page.

6. The electronic device of claim 1, wherein the processor is further configured to execute the at least one instruction to, based on the detection of the predefined touch input, reduce an object area related to a location of the predefined touch input in the writing area, and provide the extended area by applying the extended area to the object area.

7. The electronic device of claim 1, wherein the processor is further configured to execute the at least one instruction to:
 identify a location of the predefined touch input;
 determine a reference point with respect to the location of the predefined touch input; and
 reduce the writing area based on the reference point and provide the extended area at a location where a space is generated in the display area.

8. The electronic device of claim 1, wherein the processor is further configured to execute the at least one instruction to detect the predefined touch input in an edge area of the writing area,
 wherein the edge area is positioned on at least one of a right edge, a left edge, an upper edge, or a lower edge of the writing area.

9. An operation method of an electronic device, the operation method comprising:
 displaying a writing area in a display area of a display of the electronic device;
 detecting a predefined touch input in the writing area;

identifying a parameter value corresponding to the predefined touch input, the parameter value corresponding to the predefined touch input comprising at least one of a duration time of the predefined touch input, a pressure corresponding to the predefined touch input, or a number of times of the predefined touch input;

determining a size of an extended area according to the parameter value; and based on detecting the predefined touch input, reducing the writing area, displaying the reduced writing area in at least first part of the display area and providing the extended area having the size determined according to the parameter value in at least second part of the display area, the extended area being configured to receive a writing input continuing from the reduced writing area.

10. The operation method of claim 9, wherein the predefined touch input comprises at least one of a touch input for a first predefined time or more in the writing area, a touch input made repeatedly for a second predefined time in the writing area, or a touch input of which pressure exceeds a threshold value in the writing area.

11. The operation method of claim 9, further comprising:
providing a user interface for confirming whether the extended area is to be provided in the display area in response to the detection of the predefined touch input; and
based on receiving a user input in the user interface, providing the extended area.

12. The operation method of claim 9, further comprising:
based on the detection of the predefined touch input, reducing the writing area in each page among a plurality of pages included in a document, wherein a first page among the plurality of pages is an execution target of a current touch input, and
providing the extended area by applying the extended area to the plurality of pages in the document.

13. The operation method of claim 9, further comprising:
based on the detection of the predefined touch input, reducing the writing area included in a current page among a plurality of pages in a document, the current page being an execution target of a current touch input, and
providing the extended area by applying the extended area to the current page.

14. The operation method of claim 9, further comprising, based on the detection of the predefined touch input, reducing an object area related to a location of the predefined touch input in the writing area, and providing the extended area by applying the extended area to the object area.

15. The operation method of claim 9, further comprising:
identifying a location of the detected predefined touch input;
determining a reference point with respect to the location of the predefined touch input; and
reducing the writing area based on the reference point and providing the extended area at a location where a space is generated in the display area.

16. The operation method of claim 9, further comprising detecting the predefined touch input in an edge area of the writing area,
wherein the edge area is positioned on at least one of a right edge, a left edge, an upper edge, or a lower edge of the writing area.

17. A non-transitory computer-readable recording medium storing a program for performing an operation method of an electronic device, by a processor, the operation method comprising:
displaying a writing area in a display area of a display of the electronic device;
detecting a predefined touch input in the writing area;
identifying a parameter value corresponding to the predefined touch input, the parameter value corresponding to the predefined touch input comprising at least one of a duration time of the predefined touch input, a pressure corresponding to the predefined touch input, or a number of times of the predefined touch input;
determining a size of an extended area according to the parameter value; and
based on detecting the predefined touch input, reducing the writing area, displaying the reduced writing area in at least first part of the display area and providing the extended area having the size determined according to the parameter value in at least second part of the display area, the extended area being configured to receive a writing input continuing from the reduced writing area.

* * * * *